(12) United States Patent
Kumar et al.

(10) Patent No.: US 12,741,542 B2
(45) Date of Patent: Sep. 22, 2026

(54) VEHICLE POWER SUPPLY SYSTEM

(71) Applicant: Transportation IP Holdings, LLC, Norwalk, CT (US)

(72) Inventors: Ajith Kuttannair Kumar, Erie, PA (US); Bret Worden, Erie, PA (US); Jeremy Thomas McGarry, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 767 days.

(21) Appl. No.: 18/299,175

(22) Filed: Apr. 12, 2023

(65) Prior Publication Data

US 2023/0365008 A1 Nov. 16, 2023

Related U.S. Application Data

(60) Provisional application No. 63/341,292, filed on May 12, 2022.

(51) Int. Cl.
*B60L 5/36* (2006.01)
*B60L 53/14* (2019.01)
(Continued)

(52) U.S. Cl.
CPC ................ *B60L 5/36* (2013.01); *B60L 53/14* (2019.02); *B60L 53/16* (2019.02); *B60L 53/35* (2019.02);
(Continued)

(58) Field of Classification Search
CPC ........ B60L 5/36; B60L 2200/18; B60L 53/14; B60L 2200/26; B60L 53/16; B60L 53/32;
(Continued)

(56) References Cited

U.S. PATENT DOCUMENTS 1,828,949 A * 10/1931 Rossman .................. B60L 5/36 191/55
2,778,890 A * 1/1957 Storsand ............. H02H 11/001 191/1 R (Continued)

FOREIGN PATENT DOCUMENTS

CN 111344187 A * 6/2020 ............. H02J 7/751
CN 112109582 A 12/2020

(Continued)

OTHER PUBLICATIONS

Extended European Search Report received for related EP App No. 23171977 dated Oct. 13, 2023 (7 pages).

*Primary Examiner* — Cheng Lin
(74) *Attorney, Agent, or Firm* — K&L Gates LLP

(57) ABSTRACT

A vehicle power supply system and method may include plural vehicle contacts extending along a vehicle. At least three of the vehicle contacts may be power contacts that receive different phases of three-phase alternating current electrical power from an off-board power supply system to power the vehicle. A first power contact of the power contacts may receive a first phase of the three-phase alternating current and a second power contact of the power contacts may receive a second phase of the three-phase alternating current while the vehicle has a first orientation relative to the off-board power supply system. The first power contact may receive the second phase and the second power contact may receive the first phase while the vehicle has a second orientation relative to the off-board power supply system.

9 Claims, 10 Drawing Sheets

(51) Int. Cl.
*B60L 53/16* (2019.01)
*B60L 53/35* (2019.01)
*B60L 53/62* (2019.01)

(52) U.S. Cl.
CPC ........... *B60L 53/62* (2019.02); *B60L 2200/18* (2013.01); *B60L 2200/26* (2013.01); *B60L 2240/32* (2013.01)

(58) Field of Classification Search
CPC .......... B60L 53/62; B60L 53/66; B60L 53/35; B60L 2240/32
See application file for complete search history.

(56) References Cited

U.S. PATENT DOCUMENTS 3,387,183 A * 6/1968 Hess .................... H02H 11/004 361/76
3,729,599 A * 4/1973 Payen ....................... B60L 5/38 191/59
4,603,237 A * 7/1986 Ling ......................... B60L 5/36 191/73
9,352,658 B2 5/2016 Morris et al.
9,550,426 B2 * 1/2017 Santner ................... B60L 50/60
9,902,276 B2 * 2/2018 Bianco .................... B60L 53/31
10,427,532 B2 * 10/2019 Elshaer ................. H02M 3/335
11,267,358 B2 * 3/2022 Smolenaers ............ B60L 53/53
11,607,965 B2 * 3/2023 Lehn ....................... B60L 50/60
11,701,971 B2 * 7/2023 Shinomiya ........... H02H 7/1225 318/801
11,820,238 B2 * 11/2023 Blase ........................ B60L 5/18
2015/0180327 A1 * 6/2015 Matsuda ................ H01H 47/02 323/212
2023/0147695 A1 * 5/2023 Earl ........................ B60L 53/14 320/109

FOREIGN PATENT DOCUMENTS

DE 73487 C 2/1893
FR 3078820 A1 * 9/2019 ................ B60L 9/00
GB 2592986 A * 9/2021 .............. B60L 53/24

* cited by examiner 400
402
408
412
310A
308
1
2
3
414
310B
410
404
406

400
408
310B
308
412
3
2
1
416
310A
410
404
402

500
506
512
514
518A
502
518
1
C
2
+
516A
508
3
-
414
4
518B
504
516
516B
510

500
506
512
518B
502
4
C
3
+
516B
508
2
-
516A
416
1
518A
510

600
602
612
504
620
502
1
C
Panto 2
614
2
+
Panto 1
616
3
-
Panto 1
414
4
604
614
612
606
614
612
616
618
610
616
618
608
602

700
506
512
704
1
704A
C
706
2
704B
+
508
708
3
704C
-
510
414
4
704D
708
5
704E
706

700
506
5
704E
C
706
4
704D
+
708
3
704C
-
416
2
704B
708
1
704A
706

800
810
826
806
808
804
818A
+
822B
812
820A
C
820B
814
822A
-
818B
816
828
830
824

900
Couple vehicle contacts to vehicle
902
Electrically connect a control contact of the vehicle contacts to a controller
904
Electrically connect power contacts of the vehicle contacts to power electronics
906

VEHICLE POWER SUPPLY SYSTEM

CROSS-REFERENCE TO RELATED APPLICATIONS

This application is a non-provisional conversion of, and claims priority to, U.S. Provisional Patent Application No. 63/341,292, which was filed on 12 May 2022, and the entire disclosure of which is incorporated herein by reference.

BACKGROUND

Technical Field

The subject matter described herein relates to transferring electrical power between systems onboard vehicles and off-board systems, and particularly for powering the vehicles.

Discussion of Art

Some vehicles are electrically powered and receive power from off-board power supply assemblies, such as pantographs, catenary wires, and electrified rails. These vehicles are equipped with electric current-collecting contacts that conductively couple to corresponding contacts of the off-board power supply assembly to receive electrical power from the off-board power supply assembly.

A least some systems for supplying power to vehicles from off-board power supply assemblies are operable in only one orientation of the vehicle relative to the off-board assembly. The orientation of the vehicle refers to the direction that the vehicle is facing, which refers to the direction from a back end of the vehicle to a front end of the vehicle (e.g., a forward-facing direction). For example, a known system includes an array of contacts onboard the vehicle that make physically contact specific corresponding contacts of a pantograph device of the off-board power supply assembly when the vehicle is in a prescribed (e.g., designated) orientation relative to the pantograph device. If the vehicle arrives at the pantograph device with a reverse orientation from the desired orientation, the array of contacts onboard the vehicle do not align with the specific corresponding contacts of the pantograph device. For example, a vehicle contact configured to receive positive polarity electrical power may physically contact an off-board contact of the pantograph that conducts control signals. As a result of contact mis-match, no electrical power may transfer between the vehicle and the off-board power supply unless the vehicle is in the prescribed orientation.

At least some systems that include pantographs off-board the vehicle may have difficulty in aligning the vehicle relative to the pantograph to enable the corresponding contacts to couple for electrical power transfer. For example, the vehicle contacts and the off-board pantograph contacts are typically about two feet in length, which forces the vehicle operator to stop the vehicle very precisely to allow the corresponding contacts to align and couple. This task of stopping within a two foot tolerance range may be difficult for road vehicle operators, such as bus drivers, and may be relatively more difficult for rail vehicle operators, such as operators of light rail vehicles and locomotives. It may be desirable to have a system and method that differs from those that are currently available.

BRIEF DESCRIPTION

In one or more embodiments, a vehicle power supply system is provided that includes plural vehicle contacts extending along a top side of a vehicle. The plural vehicle contacts may include at least three power contacts may receive electrical power from an off-board power supply system to power the vehicle. Each of the power contacts may receive a different phase of three-phase alternating current of the electrical power. A first power contact of the power contacts may receive a first phase of the three-phase alternating current and a second power contact of the power contacts may receive a second phase of the three-phase alternating current while the vehicle has a first orientation relative to the off-board power supply system. The first power contact may receive the second phase of the three-phase alternating current and the second power contact may receive the first phase of the three-phase alternating current while the vehicle has a second orientation relative to the off-board power supply system. The second orientation may be opposite the first orientation.

In one or more embodiments, an off-board power supply system includes at least three off-board contacts, switch devices, and a controller. The off-board contacts may conductively couple to vehicle contacts mounted on a vehicle for transferring electrical power to the vehicle. The switch devices may selectively connect the off-board contacts to a power source in a first role configuration and a second role configuration that is different from the first role configuration. Each of the first and second role configurations may include at least two of the off-board contacts designated as power contacts to conduct one of different phases or different polarities of electrical power from the power source to the vehicle contacts and another of the off-board contacts designated as an auxiliary contact to provide one of a ground connection or a control connection with a corresponding one of the vehicle contacts. The controller includes one or more processors and may be operably coupled to the switch devices. The controller may determine whether an arrangement of the vehicle contacts is complementary to the first role configuration of the off-board contacts, while the off-board contacts are connected to the power source in the first role configuration. Responsive to determining that the arrangement of the vehicle contacts is not complementary to the first role configuration of the off-board contacts, the controller may actuate the switch devices to connect the off-board contacts to the power source in the second role configuration before transferring electrical power to the vehicle via the power contacts of the second role configuration.

In one or more embodiments, a method is provided that includes determining, via one or more processors, whether an arrangement of vehicle contacts mounted on a vehicle is complementary to a first role configuration of at least three off-board contacts of a power supply system disposed off-board the vehicle, while the off-board contacts are connected to a power source in the first role configuration. The first role configuration may include at least two of the off-board contacts designated as power off-board contacts to conduct one of different phases or different polarities of electrical power from the power source to the vehicle contacts and another of the off-board contacts designated as an auxiliary off-board contact to provide one of a ground connection or a control connection with a corresponding one of the vehicle contacts. Responsive to determining that the arrangement of the vehicle contacts is not complementary to the first role configuration of the off-board contacts, the method includes actuating switch devices to connect the off-board contacts to the power source in a second role configuration of the at least three off-board contacts. The off-board contact that was designated as the auxiliary off-board contact in the first role configuration may be designated as one of at least two power off-board contacts in the second role configuration and one of the off-board contacts designated as the power off-board contacts in the first role configuration may be designated as the auxiliary off-board contact in the second role configuration. The method includes transferring electrical power to the vehicle via the at least two power off-board contacts in the second role configuration.

In one or more embodiments, a vehicle power supply system is provided that includes at least three vehicle contacts, switch devices, and an onboard controller. The vehicle contacts may extend along a top side of a vehicle and may be conductively coupled to off-board contacts of an off-board power supply system for transferring electrical power to the vehicle. The switch devices may be disposed onboard the vehicle to selectively connect the vehicle contacts to a vehicle load in a first role configuration and a second role configuration that is different from the first role configuration. Each of the first and second role configurations may include at least two of the vehicle contacts designated as power contacts to conduct one of different phases or different polarities of electrical power from the off-board contacts to the vehicle load, and another of the vehicle contacts designated as an auxiliary contact to provide one of a ground connection or a control connection with a corresponding one of the off-board contacts. The onboard controller includes one or more processors and may be operably coupled to the switch devices. The onboard controller may determine whether an arrangement of the off-board contacts is complementary to the first role configuration of the vehicle contacts, while the vehicle contacts are connected to the vehicle load in the first role configuration. Responsive to determining that the arrangement of the off-board contacts is not complementary to the first role configuration of the vehicle contacts, the controller may actuate the switch devices to connect the vehicle contacts to the vehicle load in the second role configuration before transferring electrical power to the vehicle load via the power contacts of the second role configuration.

In one or more embodiments, a method is provided that includes determining, via one or more processors, whether an arrangement of off-board contacts of an off-board power supply system is complementary to a first role configuration of plural vehicle contacts extending along a top side of a vehicle. The vehicle contacts may be connected to a vehicle load in the first role configuration. The first role configuration may include at least two of the vehicle contacts designated as power contacts to conduct one of different phases or different polarities of electrical power from the off-board contacts to the vehicle load, and another of the vehicle contacts designated as an auxiliary contact to provide one of a ground connection or a control connection with a corresponding one of the off-board contacts. Responsive to determining that the arrangement of the off-board contacts is not complementary to the first role configuration of the vehicle contacts, the method may include actuating switch devices to connect the vehicle contacts to the vehicle load in a second role configuration of the vehicle contacts. The vehicle contact that was designated as the auxiliary contact in the first role configuration may be designated as one of the power contacts in the second role configuration and one of the vehicle contacts designated as the power contacts in the first role configuration may be designated as the auxiliary contact in the second role configuration. The method may include transferring electrical power to the vehicle load while the vehicle contacts are in the second role configuration.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
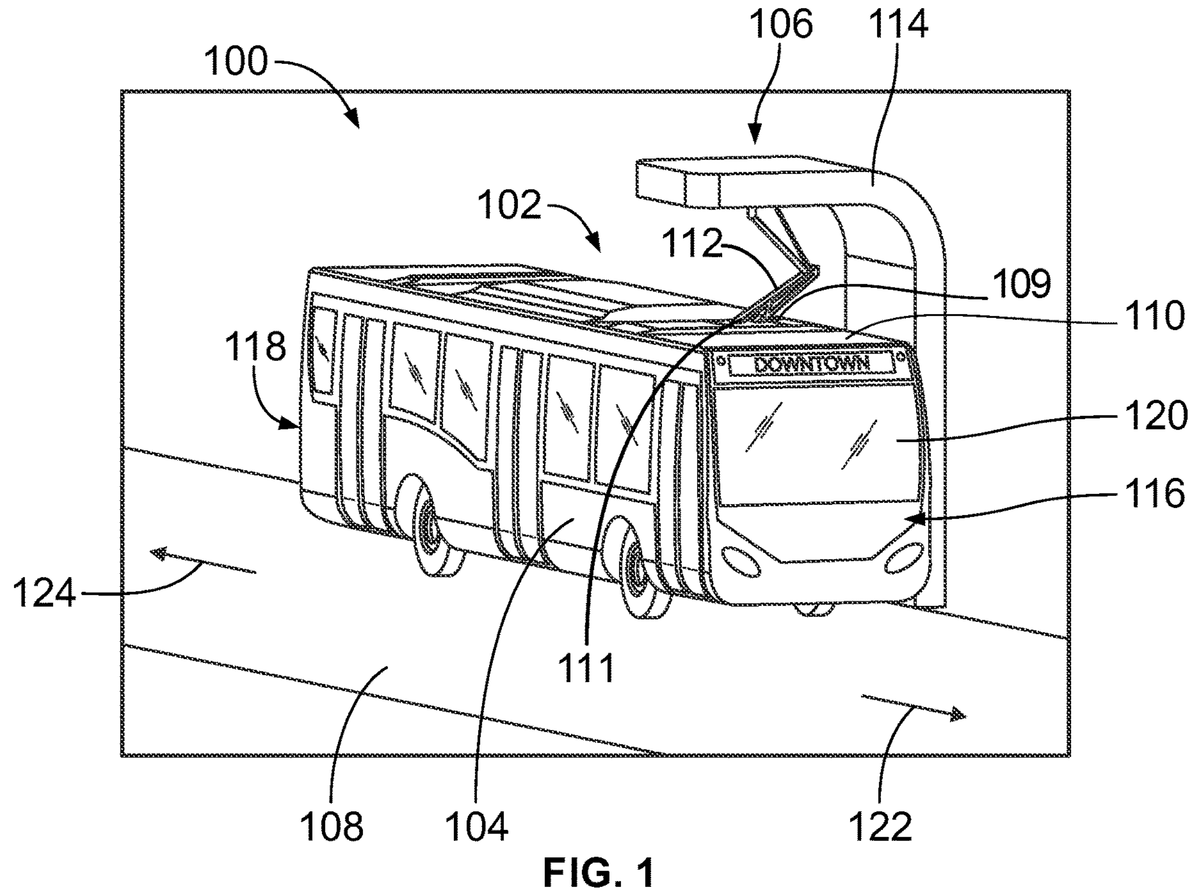
FIG. 1 is a perspective view of a power transfer system according to an embodiment according to an embodiment.

Embodiments of the subject matter described herein relate to a power transfer system that is designed to transfer electrical power between a vehicle and an off-board power supply. This may be done while the vehicle has either of at least a first orientation or a second orientation relative to the off-board power supply. The power transfer system may use off-board pantographs to transfer electrical power to vehicles with high positional tolerance between the vehicle and the pantograph.

The power transfer system according to an embodiment has bidirectionality such that the vehicle can successfully receive electrical power from the off-board power supply when on an outbound leg of a trip, and can successfully receive electrical power from the same off-board power supply on a return leg of the trip while the vehicle is facing in the opposite direction relative to the outbound leg, even if the vehicle is on the same path (e.g., track or lane) as during the outbound leg. In at least one embodiment, this bidirectionality is accomplished based on the design and arrangement of the components within the power transfer system, and without physically moving equipment on either of the vehicle or the off-board power supply to accomplish the bidirectionality. For example, vehicle contacts and corresponding off-board contacts of the off-board power supply are specifically designed and arranged such that the vehicle contacts conductively couple to the off-board contacts in a first coupling configuration while the vehicle has the first orientation relative to the off-board power supply. The vehicle contacts conductively couple to the off-board contacts in a different, second coupling configuration while the vehicle has the second orientation relative to the off-board power supply, without rearranging the vehicle contacts from configuration with the vehicle in the first orientation. The power transfer system is designed to enable power transfer between the vehicle and the off-board power supply in both the first and second configurations while maintaining safety by ensuring that the vehicle contacts are properly coupled to designated off-board contacts before conveying the electrical power.

The electrical power received by the vehicle from the off-board power supply may be used to power the vehicle. For example, the electrical power may be conveyed to an onboard energy storage device. The energy storage device may include one or more batteries. In an embodiment, the vehicle may stop at the off-board power supply for a period of time to recharge the batteries. The energy storage device may be controlled to selectively supply electrical power to motors of a propulsion system for propelling the vehicle along a route. Alternatively, the electrical power may be conveyed directly to the motors of the propulsion system, for propelling the vehicle, without first storing the electrical power in the energy storage device.

The power transfer system according the embodiments described herein provides a greater positional tolerance for the vehicle than known power transfer systems. For example, the vehicle may have a window (e.g., range) of about 20 feet or more within which to stop relative to the off-board power supply to enable electrical power transfer. This positional tolerance enables application of the power transfer system to vehicles that have difficulty making precision stops, such as rail vehicles and multi-vehicle systems where the operator is in a different vehicle than the vehicle which electrically couples to the off-board power supply.

While one or more embodiments are described in connection with a rail vehicle system, not all embodiments may relate to rail vehicle systems. Unless expressly disclaimed or stated otherwise, the inventive subject matter described herein extends to other types of vehicles. Suitable vehicles may be buses, trucks (with or without trailers), automobiles, mining vehicles, agricultural vehicles, marine vessels, and other off-highway vehicles. Other suitable vehicles may be electric aircraft, which may necessitate the contacts being on an underside of the vehicle. Some suitable vehicles may be autonomous, or remotely piloted. The vehicles described herein can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy, consist, swarm or platoon).

FIG. 1 is a perspective view of a power transfer system 100 according to an embodiment. The power transfer system includes a vehicle power supply system 102 disposed onboard a vehicle 104 and an off-board power supply system 106. The vehicle travels on a route 108. The vehicle in the illustrated example is a bus that travels on a road which represents the route. The off-board power supply system 106 is a stationary structure (e.g., monument) located along a side of the route. The vehicle moves relative to the off-board power supply system (also referred to herein as off-board system) as the vehicle travels along the route. In the illustrated embodiment, the vehicle stops at the off-board system to receive electrical power from the off-board system for powering the vehicle. For example, the electrical power received from the off-board system may be used to recharge one or more batteries of an onboard energy storage device. The off-board system includes a power source, such as access to an electrical grid or network, one or more batteries, or the like.

As described herein, the vehicle power supply system includes at least one set of electrically conductive elements 109, referred to herein as vehicle contacts. The contacts may extend along a top side 110 of the vehicle. The off-board system includes at least one set of electrically conductive elements 111, referred to herein as off-board contacts. The off-board contacts are held by at least one frame 112. The frame is mounted to a base structure 114 of the off-board system. When the vehicle stops within a designated stopping window (e.g., range) relative to the off-board system, the contacts onboard the vehicle align with corresponding off-board contacts. The vehicle contacts conductively couple to the corresponding off-board contacts. The conductive coupling may occur via direct physical (e.g., mechanical) contact between the vehicle contacts and off-board contacts. For example, the frame of the off-board system may be extendable and retractable relative to the base structure to bridge a clearance gap between the base structure and the vehicle contacts while the vehicle is located within the stopping window. In an embodiment, the frame and the off-board contacts are components of a pantograph of the off-board system. Optionally, the vehicle power supply system may be designed to raise or lift the vehicle contacts towards the off-board contacts in addition to, or instead of, the pantograph of the off-board system extending towards the vehicle. For example, the vehicle power supply system may include a vehicle pantograph that holds the vehicle contacts.

The vehicle in FIG. 1 has a first orientation relative to the off-board system. The first orientation represents a direction that the vehicle is facing (e.g., a forward-facing direction). The vehicle has a front end 116 and a back end 118 opposite the front end. The operator sits near the front end and views the route through a windshield 120. An arrow parallel to a longitudinal axis of the vehicle and extending from the back end to the front end has a first forward-facing direction 122, which represents the first orientation of the vehicle. In an embodiment, the power transfer system is bidirectional, such that electrical power transfer can occur with the vehicle having the first orientation, as illustrated, as well as the vehicle having a second orientation. In the second orientation, the vehicle is facing in a second forward-facing direction 124 that is opposite the first forward-facing direction. The first and second orientations do not refer to direction of travel. It is noted that the vehicle can back up while having the first orientation, such that the vehicle moves in the second forward-facing direction without having the second orientation. The bidirectionality enables the off-board system to power vehicles traveling along the route in different directions. This increased functionality may reduce the number of off-board systems needed to power vehicles along a segment of route, relative to unidirectional systems, and thereby reduce cost and reduce the footprint of the off-board systems along the route.

Figure 2:
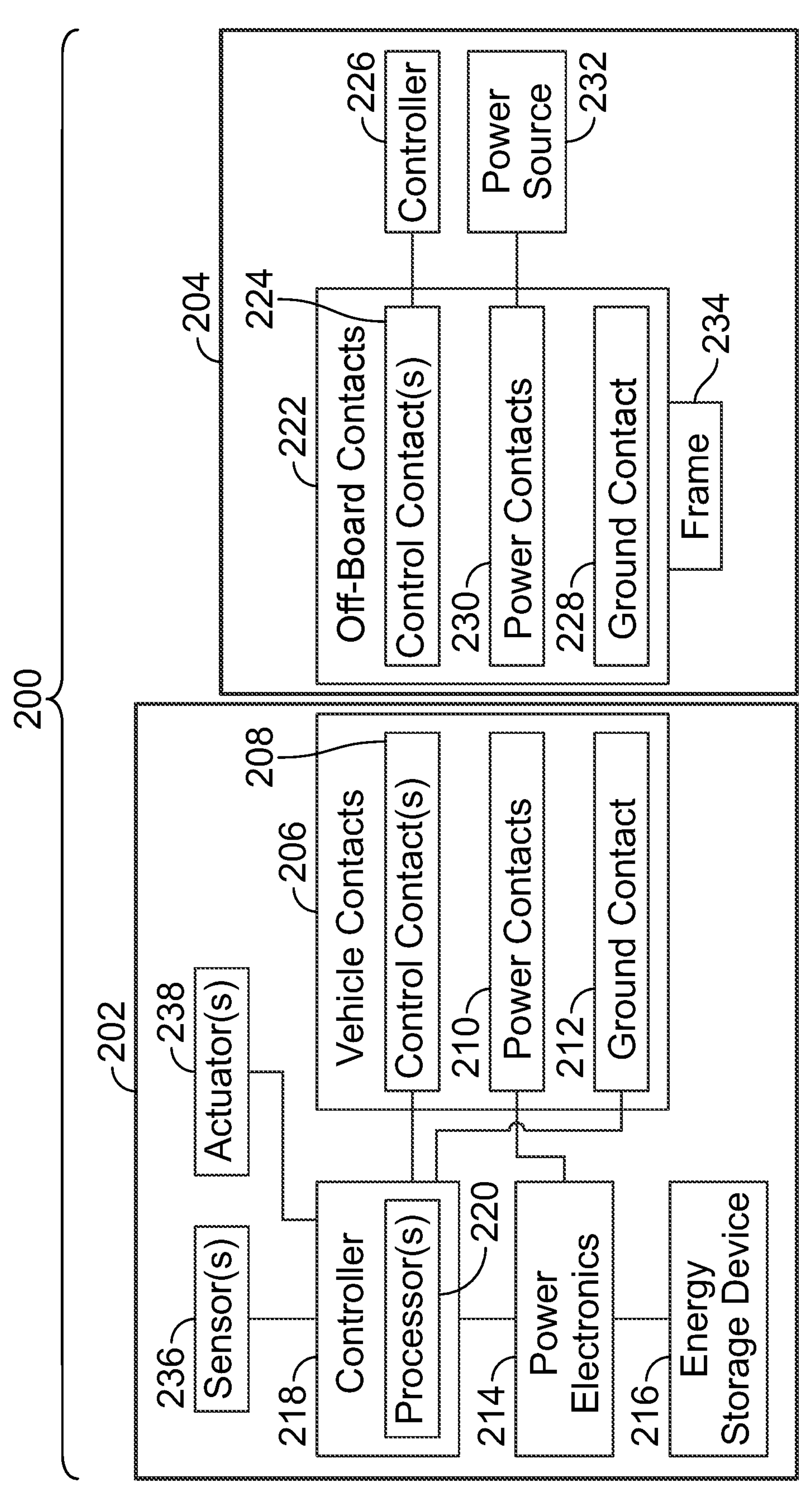
FIG. 2 is a block diagram of a power transfer system for powering a vehicle according to an embodiment.

FIG. 2 is a block diagram of a power transfer system 200 for powering a vehicle according to an embodiment. The power transfer system in FIG. 2 may represent the power transfer system shown in FIG. 1. The power transfer system includes a vehicle power supply system 202 and an off-board power supply system (e.g., off-board system) 204. One or both of the vehicle power supply systems and off-board power supply system may include more components and/or different components than the components illustrated in FIG. 2.

The vehicle power supply system includes vehicle electrical contacts 206. The vehicle electrical contacts, referred to herein as vehicle contacts, are electrically conductive elements (e.g., electrical conductors) that convey control signals, electrical power, and/or provide a ground path. The vehicle contacts may be elongated, having the shape of rails or strips. The vehicle contacts may extend along a top side of the vehicle on which the vehicle power supply system is disposed.

The vehicle contacts may include one or more control contacts 208, plural power contacts 210, and a ground contact 212. In one or more embodiments, the power contacts receive different polarities of direct current (DC) electrical power from the off-board system. For example, one or two power contacts receive positive polarity electrical power, and another one or two power contacts receive negative polarity electrical power, depending on the orientation of the vehicle. In one or more other embodiments, the power contacts receive different phases of alternating current (AC) electrical power from the off-board system. For example, in the first orientation of the vehicle relative to the off-board system, one power contact receives a first phase of three-phase alternating current, a second power contact receives a second phase of the three-phase alternating current, and a third power contact receives a third phase of the three-phase alternating current. In the second orientation of the vehicle relative to the off-board system, three power contacts again receive the three different phases of the alternating current, although at least some of the power contacts receive a different phase than when the vehicle is in the first orientation.

The ground contact provides a conductive ground path between the vehicle power supply system and the off-board system. The control contact(s) provides connection assurance to ensure, for safety purposes, that all of the contacts are properly connected prior to permitting power transfer between the vehicle power supply system and the off-board system. For example, the control contact(s) conduct a control signal indicative of whether the power contacts are conductively coupled with corresponding off-board contacts. The control signal may only be conducted when the power contacts, the control contact(s), and the ground contact is conductively coupled to respective corresponding off-board contacts. In other embodiments, the vehicle may have a separate grounding circuit, which enables the vehicle contacts to omit a discrete ground contact. For example, rail vehicles may be grounded via the connection between the wheels of the rail vehicles to the rails of the track.

The vehicle power supply system includes power electronics 214 conductively connected to the power contacts. The power electronics represent circuitry for conveying electrical power between the power contacts and one or more vehicle loads onboard the vehicle. The vehicle loads may include at least one electric traction motor, an energy storage device 216, and the like. The electric traction motor(s) may generate tractive effort for propelling movement of the vehicle. The energy storage device may include one or more batteries. The batteries may be lithium ion batteries, nickel-metal hydride, lead-acid, or the like. Optionally, the energy storage device may include one or more capacitors, such as ultracapacitors. The capacitors may be present with batteries or instead of batteries. The energy storage device may be conductively coupled to the electric traction motor(s). In one control setting, the power electronics may convey electrical power received from the off-board system, via the power contacts, to the energy storage device to charge the energy storage device. In another control setting, the power electronics may be controlled to bypass the energy storage device and convey the electrical power to the electric traction motor(s) to power propulsion.

The power electronics may include electrical devices for modifying the electrical power. The power electronics may step up or down the voltage of the electrical power, may change one or more of the polarities of the electrical power, may change the phase, and/or the like. In an example, the power electronics may switch a negative polarity of the electrical power to a positive polarity, and may switch a positive polarity of the electrical power to a negative polarity. The power electronics may include one or more rectifiers for modifying the electrical power.

The vehicle power supply system may include a controller 218 that is operably connected to the other components of the vehicle power supply system via wired and/or wireless communication pathways. By "operably connected," it is meant that two or more devices, subsystems, assemblies, modules, components, and the like, are joined by one or more wired or wireless communication links, such as by one or more conductive (e.g., copper) wires, cables, or buses; wireless networks; fiber optic cables; or the like. The controller may be a control circuit. The controller represents hardware circuitry that includes and/or is connected with one or more processors 220 (e.g., one or more microprocessors, integrated circuits, microcontrollers, field programmable gate arrays, etc.). The controller includes and/or is connected with a tangible and non-transitory computer-readable storage medium (e.g., memory device). The memory device may store programmed instructions (e.g., software) that is executed by the one or more processors to perform the operations of the controller described herein.

The controller may be operably connected to the control contact(s) and the ground contact. For example, the controller may generate and/or receive control signals conveyed through the control contact(s) to determine whether the vehicle contacts are properly connected to corresponding off-board contacts 222 of the off-board system. When the control contact(s) is electrically connected to one or more control off-board contact(s) 224 of the off-board contacts, a closed circuit is established and the control signal is conducted along the closed circuit. The controller can detect that the circuit is closed by generating and then receiving the same control signal along a circuit loop that includes the control off-board contact(s), receiving a control signal generated by a controller 226 of the off-board system, and/or generating a control signal that is received by the controller of the off-board system.

The controller 226 of the off-board system represents hardware circuitry that includes and/or is connected with one or more processors. The controller 226 of the off-board system may have similar hardware and components as the controller onboard the vehicle. The control circuit along which the control signal is conveyed may include the ground contact and a corresponding ground off-board contact 228 of the off-board system, such that the circuit is only closed and conducting while both the control contact(s) and the ground contact are conductively coupled to each of the corresponding control and ground off-board contacts of the off-board system.

In an embodiment, conduction of the control signal along the control circuit is indicative that the power contacts are properly connected to corresponding power off-board contacts 230 of the off-board system. For example, the vehicle contacts may be positioned such that the power contacts on the vehicle conductively couple to the off-board power contacts before the vehicle control contact(s) can conductively couple to the off-board control contact(s). The vehicle contacts may be positioned such that coupling of the vehicle control contact(s) to the off-board control conduct(s) only occurs when the vehicle power contacts are coupled to the power off-board contacts. Furthermore, non-conduction of the control signal is indicative that not all of the required couplings between the conductive elements have been established, so the power transfer system is not ready to transfer power.

The controller onboard the vehicle and/or the controller of the off-board system permit the transfer of power after determining that the vehicle contacts are conductively coupled to the corresponding off-board contacts. For example, the controller onboard the vehicle may actuate at least one switch device of the power electronics (or otherwise in the circuit path between the power contacts and the energy storage device), to establish a close conducting pathway from the power contacts to the energy storage device. Optionally, the controller of the off-board system may actuate at least one switch device to enable the transfer of power from a power source 230 of the off-board power supply system to the vehicle power supply system via the off-board power contacts and the vehicle power contacts. The power source may be a connection interface and electronics for receiving electrical power from an electrical grid or network. Alternatively, or in addition, the power source may include one or more batteries, capacitors, or the like. The off-board contacts of the off-board system are held in place on a frame 234. The frame and the off-board contacts may represent all or a portion of a pantograph. For example, the frame may be an extendable and retractable frame, similar to the frame of the pantograph shown in FIG. 1.

The vehicle power supply system optionally includes one or more sensors 236 and/or one or more actuators 238. The actuator(s) is mounted along the top side of the vehicle and mechanically attaches to at least some of the vehicle contacts. The actuator(s) may be operably connected to the controller onboard the vehicle. The controller may selectively control the actuator(s) to raise and lower the vehicle contacts that are attached to the actuator(s) for moving the vehicle contacts into and out of contact with the off-board contacts of the off-board system. The actuator(s) may include an electrically-controlled motor attached to structural elements that connect to the vehicle contacts. In an embodiment, the controller controls the actuator(s) to move the power contacts from a retracted position to an extended position in response to detecting a triggering event. The retracted and extended positions are relative to the (top side of the) vehicle. For example, the power contacts in the extended position are located higher above the top side (e.g., and above the route) than the same power contacts in the retracted position. In the extended position, the vehicle contacts are poised for conductive coupling to the off-board contacts of the off-board system.

One triggering event may be detecting that the vehicle is proximate to the off-board power supply system. For example, the one or more sensors onboard the vehicle may include a proximity sensor, a distance sensor, an audio sensor, or the like. The sensor may generate sensor signals that indicate a proximity of the vehicle (or at least the vehicle contacts) to the off-board system. Once the vehicle contacts are determined to be within a threshold proximity of the off-board system, the controller may control the actuator(s) to raise the vehicle contacts to the extended position. A second triggering event may be detecting that the vehicle control contact is electrically connected with the corresponding off-board control contact of the off-board power supply system. For example, when the vehicle power supply system is not in use (e.g., not transferring electrical power with the off-board system), the vehicle control contact(s) may remain in an extended position while the vehicle power contacts occupy a retracted position. With the vehicle control contact(s) extended, the control contact(s) may conductively couple to the off-board control contacts as the vehicle arrives at the off-board system. After confirming that the control contact(s) are conductively coupled to the off-board system, the onboard controller may control the actuator(s) to lift the power contacts to the extended position, such that the power contacts move upward into contact with the corresponding off-board power contacts.

Figure 3:
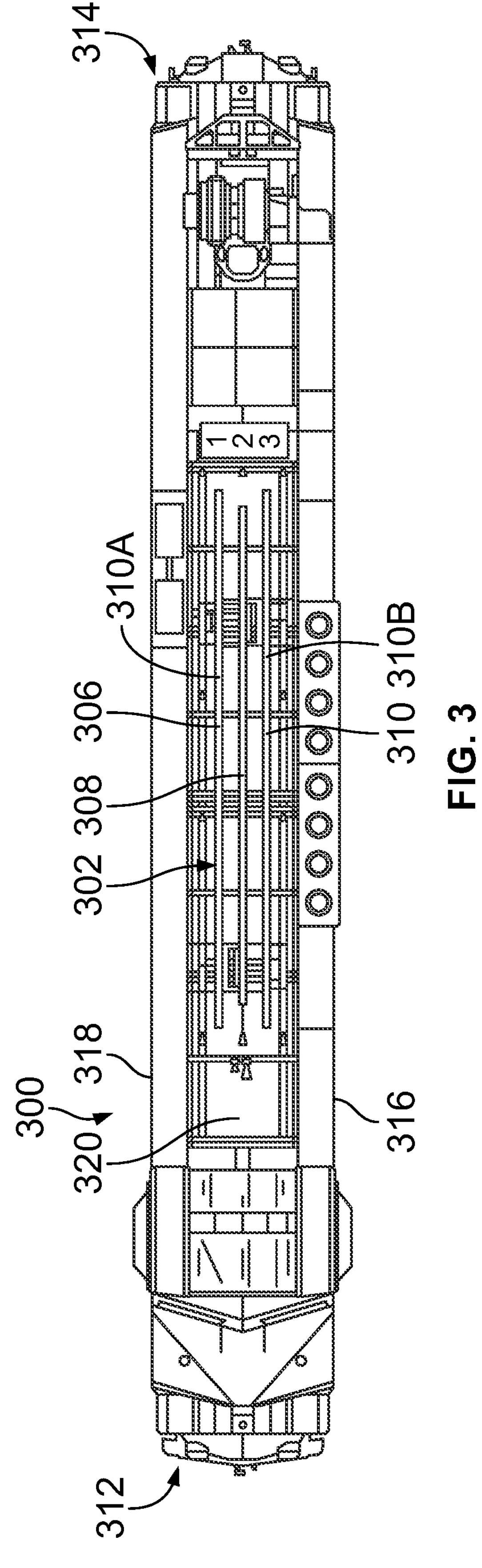
FIG. 3 is a top-down plan view of a vehicle that includes a vehicle power supply system of the power transfer system according to an embodiment.

FIG. 3 is a top-down plan view of a vehicle 300 that includes a vehicle power supply system 302 according to an embodiment. The vehicle power supply system in FIG. 3 may represent the vehicle power supply system shown in FIG. 2 and/or may be part of the power transfer system shown in FIG. 1. Only the vehicle contacts 306 of the vehicle power supply system are visible in FIG. 3.

The vehicle has a front end 312 and a back end 314 opposite the front end. The vehicle has a first side 316 and a second side 318 that extend from the back end to the front end. The second side is opposite the first side. The vehicle has a top side 320 that is between the first side and the second side and extends from the back end to the front end. The vehicle power supply system includes the vehicle contacts extending along the top side of the vehicle. The vehicle contacts may be the vehicle contacts shown in FIG. 2. The vehicle contacts in the illustrated embodiment are electrically conductive rails. The rails are exposed along the top side of the vehicle to physically contact off-board contacts of an off-board power supply system (e.g., the supply contacts shown in FIG. 2). The vehicle contacts are laterally spaced apart from each other at different locations between the first and second sides of the vehicle. The vehicle contacts may be parallel to one another. The vehicle contacts may be parallel to a longitudinal or length axis of the vehicle. In an embodiment in which the vehicle is a rail vehicle that travels on a railroad track, the vehicle contacts may be oriented parallel to the rails of the track. The vehicle contacts may be centered relative to the track. For example, a centerline that is midway between the two outermost vehicle contacts in the row of vehicle contacts may be colinear with a centerline of the track midway between the two rails on which the vehicle is disposed.

In the illustrated embodiment, the vehicle power supply system has three vehicle contacts labeled "1", "2", and "3". The three contacts include a control contact 308 (e.g., contact 2 in FIG. 3) and two power contacts 310. The power contacts include a first power contact 310A (e.g., contact 1) and a second power contact 310B (e.g., contact 3). The first and second power contacts may receive different polarities of electrical power from an off-board power supply system to power the vehicle. The control contact may conduct a control signal indicative of whether the first and second power contacts are conductively coupled with the off-board power supply system. In the illustrated embodiment, the control contact has a medial position between the first and second power contacts.

In a working example, the vehicle contacts may be relatively long which increases the positional tolerance of the vehicle relative to the off-board power supply system. For example, the vehicle contacts may extend lengths that are at least 20% of a total length of the vehicle from the front end to the back end. Optionally, the vehicle contacts may extend lengths that are at least 25%, at least 30%, at least 33.3% (e.g., one-third), or at least 35% of the vehicle length. The contact lengths may be selected with reference to application specific parameters. In the illustrated embodiment, the vehicle is a locomotive that is about 15 meters long, and is part of a train that is about 75 meters long. The vehicle contacts may be about 3 meters in length. In another embodiment, the contacts are about 10 meters long and run about the entire length of the locomotive. Optionally, each of the vehicle contacts may be defined by multiple sections that are electrically and mechanically coupled together, rather than having monolithic contacts that extend long lengths. Segmenting the contacts may ease maintenance tasks by enabling the selective removal of one section relative to another section to access a desired area of the vehicle. The segmented contacts may enable the contacts to flex at the joints, to reduce strain on the contact material. Segmentation may allow for relatively easier maintenance and replacement.

The length of the vehicle contacts may define the length of the stopping window within which the vehicle can stop to enable the vehicle contacts to align with and conductively couple to the off-board contacts. For example, the vehicle (e.g., locomotive) must stop at a location such that the off-board contacts of the off-board power supply system are located between the two ends of the vehicle contacts. In the illustrated embodiment, the center control contact is shorter than the lateral power contacts, and the length of the stopping window is defined (at least partially) by the length of the control contact. The control contact may be shorter than the power contacts as failsafe mechanism to avoid a situation in which the control contact is coupled to the off-board control contact while at least one of the power contacts is not properly coupled to the corresponding power contact, due to the angle of the vehicle relative to the off-board system, the longitudinal position of the vehicle relative to the off-board system, and/or the like.

Figures 4A, 4B, 5A, 5B, 6:
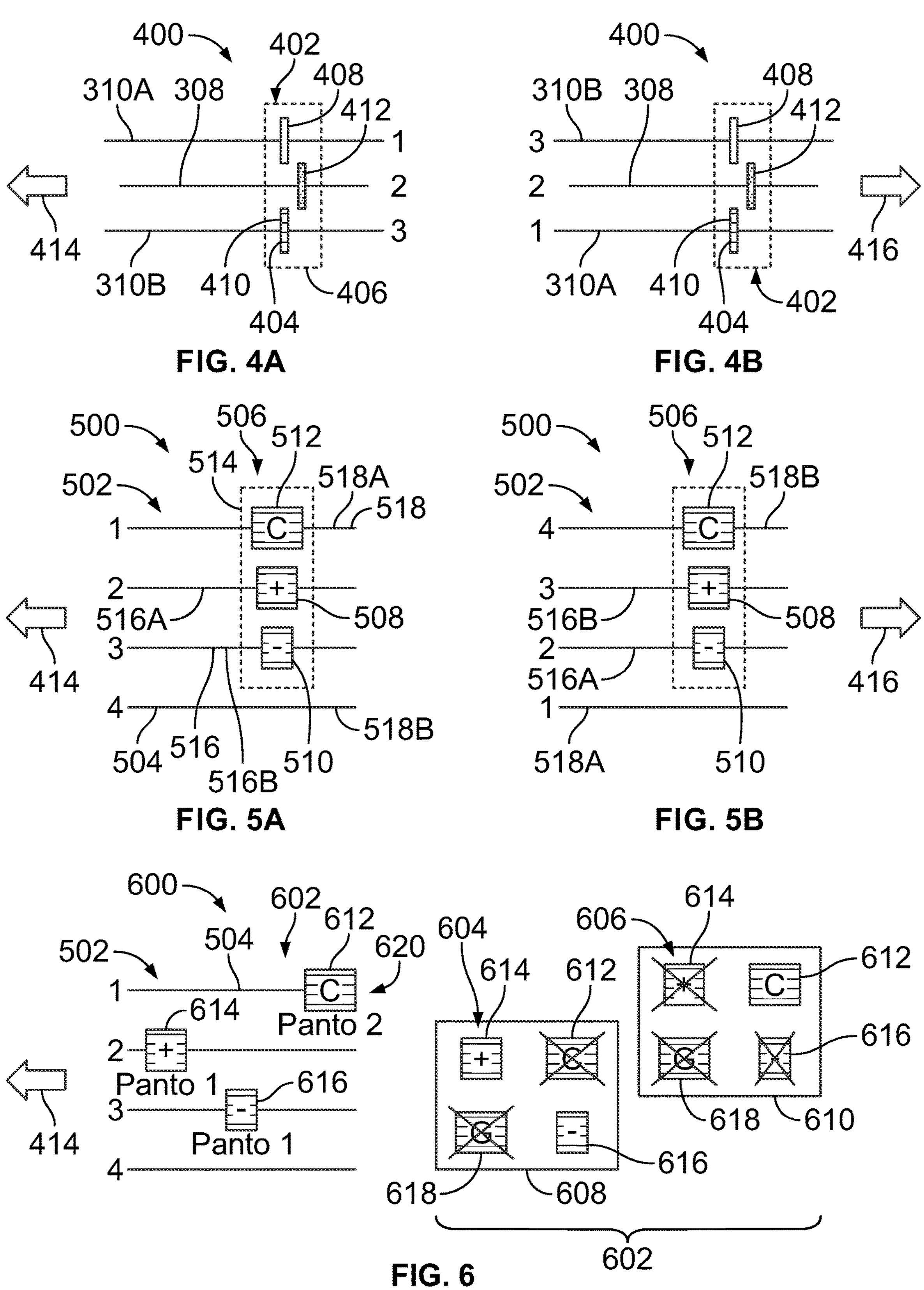
FIG. 4A is a diagram of a power transfer system with a vehicle in a first orientation relative to an off-board power supply system according to an embodiment.
FIG. 4B is a diagram of the power transfer system of FIG. 4A with the vehicle in a second orientation relative to the off-board power supply system.
FIG. 5A is a diagram of a power transfer system with a vehicle in the first orientation relative to an off-board power supply system according to another embodiment.
FIG. 5B is a diagram of the power transfer system of FIG. 5A with the vehicle in the second orientation relative to the off-board power supply system.
FIG. 6 is a diagram of a power transfer system which is a variation of the power transfer system shown in FIGS. 5A and 5B.

FIG. 4A is a diagram of a power transfer system 400 according to an embodiment. The power transfer system includes the vehicle power supply system with the three vehicle contacts shown in FIG. 3. The power transfer system may include an off-board power supply system 402. The off-board power supply system may be the off-board power supply system shown in FIG. 1 and/or FIG. 2. The off-board power supply system (referred to herein as off-board system) includes three off-board contacts 404 that are held by a frame 406. The diagram represents a top-down view, similar to the view in FIG. 3, showing the frame and off-board contacts overlaid on top of the vehicle contacts.

The off-board contacts in an embodiment include a positive off-board contact 408, a negative off-board contact 410, and a control off-board contact 412. For ease of identification, the positive off-board contact is illustrated as having no shading or interior lines; the negative off-board contact has stripes; and the control off-board contact is shaded. The off-board contacts are elongated and extend transverse to the vehicle contacts. For example, the off-board contacts may be approximately perpendicular (e.g., within +/−10 degrees of 90 degrees) to the vehicle contacts. The off-board contacts are spaced apart for conductively coupling to different corresponding vehicle contacts, without conductively coupling to each other (e.g., electrical shorting). The elongate lengths of the off-board contacts may be between 1 and 4 feet, which provides some lateral positional tolerance for the vehicle relative to the off-board system. Although lateral tolerance is not a concern for rail-based vehicles like the locomotive shown in FIG. 3, lateral tolerance can be an issue for buses and other non-rail vehicles. Staggering the off-board contacts such that the middle control off-board contact is off-set relative to the positive and negative off-board contacts allows the off-board contacts to have relatively long lateral lengths to provide generous lateral positional tolerance without risk of electrical shorting. The lateral positional tolerance may be approximately equal to the shortest contact length, such that the tolerance may be between 1 and 4 feet.

The diagram of FIG. 4A shows a first coupling configuration that occurs while the vehicle has a first orientation relative to the off-board system. In the first orientation, the vehicle faces in a first forward-facing direction 414, which is the direction that the locomotive in FIG. 3 is facing. In this first coupling configuration, the first power contact (e.g., contact 1) is positioned to contact the positive off-board contact; the control contact (e.g., contact 2) is positioned to contact the control off-board contact; and the second power contact (e.g., contact 3) is positioned to contact the negative off-board contact. The contact refers to the conductive coupling that occurs when the off-board contacts are lowered towards the contacts on the vehicle (as shown by the pantograph in FIG. 1) and/or the contacts on the vehicle are raised towards the off-board contacts until the vehicle contacts physical engage the corresponding off-board contacts. The vehicle control contact couples to the off-board control contact to convey the control signal that is indicative of whether the vehicle power contacts are conductively coupled to the corresponding positive and negative off-board contacts. Once the transfer of electrical power is initiated, the first vehicle power contact receives a positive polarity of the electrical power from the off-board positive contact. The second vehicle power contact receives a negative polarity of the electrical power from the off-board negative contact.

FIG. 4B is a diagram of the power transfer system of FIG. 4A with the vehicle in a second orientation relative to the off-board power supply system. The second orientation of the vehicle is opposite the first orientation shown in FIG. 4A. For example, the vehicle faces in a second forward-facing direction 416 that is opposite the first forward-facing direction. If the locomotive in FIG. 3 has the first orientation, the second orientation represents a 180-degree flip of the locomotive from the illustrated orientation, such that the front is now facing towards the right side of the page. The flipped orientation causes the first vehicle power contact (e.g., contact 1) to now be below the control contact (e.g., contact 2) in the illustrated diagram, and the second power contact (e.g., contact 3) to be above the control contact in the diagram. The off-board power supply system is unchanged from FIG. 4A because the off-board power supply system did not change its position.

FIG. 4B shows a second coupling configuration when the vehicle is in the second orientation relative to the off-board system. In the second coupling configuration, the second vehicle power contact is positioned to couple to the off-board positive contact of the off-board system, and the first vehicle power contact is positioned to couple to the off-board negative contact of the off-board system. The vehicle control contact is still positioned to couple to the off-board control contact of the off-board system, such that the vehicle control contact couples to the off-board control contact regardless of whether the vehicle is in the first or second orientation. Once the transfer of electrical power is initiated, the second vehicle power contact receives the positive polarity of the electrical power from the off-board positive contact, and the first vehicle power contact receives the negative polarity of the electrical power from the off-board negative contact.

The first and second power contacts on the vehicle effectively switch polarity depending on the orientation of the vehicle. In an embodiment, the power electronics of the vehicle power supply system accommodate this switch in polarity. For example, the power electronics may rectify the positive polarity of the electrical power and/or the negative polarity of the electrical power. In an embodiment, the power electronics may rectify the positive polarity and the negative polarity while the vehicle has the second orientation, but not while the vehicle has the first orientation. For example, the first power contact may be planned as a positive polarity contact, so the power electronics do not switch the polarity when the first power contact receives the positive polarity in the first orientation, but the power electronics do switch the polarity when the first power contact receives the negative polarity in the second orientation.

The vehicle contacts lack a ground contact in the illustrated embodiment. A ground circuit may be provided by the contact between the wheels of the locomotive and the rail or a dedicated grounding connection that is separate from the vehicle contacts.

Optionally, the off-board system may include a second positive contact and a second negative contact to increase the rate (e.g., current) of power transfer to the vehicle. For example, the second off-board positive contact may be next to the existing off-board positive contact such that both positive contacts conductively couple to the same vehicle power contact (e.g., either the first or the second power contact depending on the vehicle orientation). The second off-board negative contact may be next to the existing off-board negative contact such that the off-board negative contacts couple to the same vehicle power contact.

FIG. 5A is a diagram of a power transfer system 500 according to another embodiment. The power transfer system includes a vehicle power supply system 502 with the four vehicle contacts 504. The vehicle power supply system may be similar to the vehicle power supply system shown in FIGS. 3, 4A, and 4B, except for the addition of an additional vehicle contact and a different arrangement of the vehicle contacts, as described below. The power transfer system may include an off-board power supply system 506 that has a positive off-board contact 508, a negative off-board contact 510, and a control off-board contact 512 held by a frame 514. The off-board system may be similar to the off-board system shown in FIGS. 4A and 4B except for the positioning of the off-board contacts. For identification purposes, the contacts of the off-board system are labeled "c" for control, "+" for positive, and "−" for negative. Although the off-board contacts are illustrated as boxes, the off-board contacts may have the thin, elongated shapes of the off-board contacts shown in FIGS. 3, 4A, and 4B. FIG. 5A shows the coupling configuration that occurs while the vehicle has the first orientation relative to the off-board system, such that the vehicle faces the first forward-facing direction.

In the illustrated embodiment, the vehicle contacts include two power contacts 516 and two control contacts 518. The contacts are labeled "1" through "4". In an embodiment, the two power contacts are between the two control contacts. For example, a first control contact 518A is contact 1; a first power contact 516A is contact 2; a second power contact 516B is contact 3; and a second control contact 518B is contact 4.

While the vehicle has the first orientation relative to the off-board system, the first control contact (e.g., contact 1) is positioned to align with and contact the control off-board contact. The first power contact (e.g., contact 2) is positioned to align with and contact the positive off-board contact, and the second power contact (e.g., contact 3) is positioned to align with and contact the negative off-board contact. As such, the first control contact conducts the control signal, the first power contact receives the positive polarity of the electrical power, and the second power contact receives the negative polarity of the electrical power. The second control contact (e.g., contact 4) does not contact or conductively couple to any of the off-board contacts of the off-board system in the first orientation.

FIG. 5B is a diagram of the power transfer system of FIG. 5A with the vehicle in the second orientation relative to the off-board power supply system. While the vehicle is oriented in the second forward-facing direction 416, the order of the contacts is flipped relative to the off-board contacts, which are unchanged. In this second coupling configuration, the second control contact (e.g., contact 4) aligns with and contacts the control off-board contact, the second power contact (e.g., contact 3) aligns with and contacts the positive off-board contact, and the first power contact (e.g., contact 2) aligns with and contacts the negative off-board contact. The first control contact (e.g., contact 1) does not contact or conductively couple to any of the off-board contacts in the second orientation.

The illustrated embodiment is similar to the embodiment shown in FIGS. 4A and 4B in that the power contacts receive different polarities of the electrical power depending on the orientation of the vehicle. As described above, the power electronics may rectify the positive polarity and/or the negative polarity of the electrical power to switch the polarity in at least one of the orientations. In an embodiment, the first and second control contacts are electrically connected to each other, such that the control contacts effectively function as single contact. As such, the control circuit may function the same regardless of whether the first control contact or the second control contact conductively couples to the control off-board contact.

FIG. 6 is a diagram of a power transfer system 600 which is a variation of the power transfer system shown in FIGS. 5A and 5B. For example, the power transfer system in FIG. 6 includes the same vehicle power supply system as the embodiment in FIGS. 5A and 5B with the four vehicle contacts. The power transfer system has a different off-board power supply system 602 than the earlier embodiment. The off-board system includes a first off-board contact set 604 and a second off-board contact set 606. The first off-board contact set may be components of a first pantograph 608 of the off-board system, and the second off-board contact set may be components of a second pantograph 610 of the off-board system. The two pantographs may be copies or replicas of each other. Each of the first and second off-board contact sets has a control off-board contact 612, a positive off-board contact 614, a negative off-board contact 616, and a ground off-board contact 618 arranged in a two-by-two grid or array. The second off-board contact set is offset from the first off-board contact set.

In the illustrated embodiment, several of the contacts in the first and second off-board contact sets are disabled, either via removal or disconnection, such that those contacts do not conduct electrical signals or power. The disabled contacts are shown in FIG. 6 by "X" marks. In the first off-board contact set, the control and ground contacts are disabled. In the second off-board contact set, the positive, ground, and negative contacts are disabled. The net result of disabling the contacts and positioning the two off-board contact sets with the offset is an active set 620 of three contacts shown overlaid on the vehicle contacts. The active set of off-board contacts is constructively the same as the off-board contacts shown in FIGS. 5A and 5B. The embodiment of FIG. 6 achieves similar functionality as the embodiment of FIGS. 5A and 5B using two existing pantographs, without requiring a redesign.

Figures 7A, 7B, 8, 9:
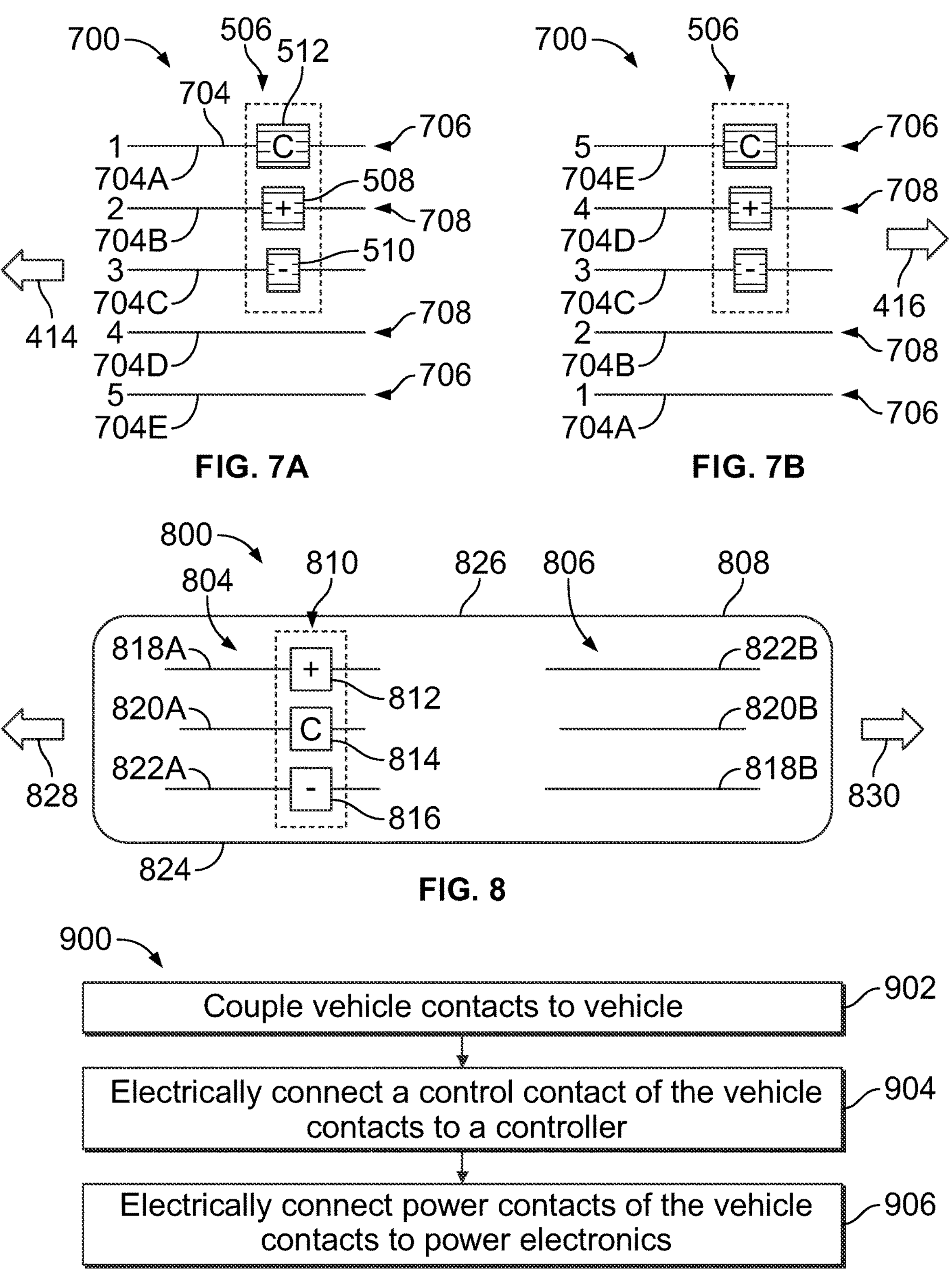
FIG. 7A is a diagram of a power transfer system with a vehicle in the first orientation relative to an off-board power supply system according to another embodiment.
FIG. 7B is a diagram of the power transfer system of FIG. 7A with the vehicle in the second orientation relative to the off-board power supply system.
FIG. 8 illustrates a power transfer system according to another embodiment.
FIG. 9 is a flow chart of a method of forming a vehicle power supply system according to an embodiment.

FIG. 7A is a diagram of a power transfer system 700 according to another embodiment. The power transfer system includes the same off-board power supply system shown in FIGS. 5A and 5B. The power transfer system includes a vehicle power supply system 702 with five vehicle contacts 704. The vehicle contacts include a first contact 704A, a second contact 704B, a third contact 704C, a fourth contact 704D, and fifth contact 704E. The vehicle contacts extend parallel to one another and are laterally spaced in the numerical order such that the third contact is a medial or middle contact. The first contact (e.g., "1" in FIGS. 7A and 7B) and the fifth contact ("5") define a first pair 706 of contacts. The first and fifth contacts may be electrically connected to each other to effectively function as single contact. The second contact ("2") and the fourth contact ("4") define a second pair 708 of contacts. The second and fourth contacts may be electrically connected to each other to effectively function as single contact. The second pair is electrically separate from (e.g., not electrically connected to) the first pair. The second pair is disposed between the first pair (e.g., between the first and fifth contacts). The third or medial contact ("3") is disposed between the second pair of contacts (e.g., between the second and fourth contacts).

The illustrated embodiment of the power transfer system does not require any polarity switching. For example, no contacts receive the positive polarity of the electrical power in the first vehicle orientation, and the negative polarity of the electrical power in the second vehicle orientation. This is accomplished by designating different functions for each of the first pair of contacts, the second pair of contacts, and the medial contact. For example, one of the first pair, the second pair, or the medial contact functions as a positive contact to receive the positive polarity of the electrical power in each of the first and second orientations of the vehicle relative to the off-board system. Another of the first pair, the second pair, or the medial contact functions as a negative contact to receive the negative polarity of the electrical power in each of the first and second vehicle orientations. The last of the first pair, the second pair, or the medial contact defines the control contact. The control contact conductively couples to the off-board control contact of the off-board system to conduct the control signal indicative of whether the positive and negative contacts are properly coupled to the corresponding off-board contacts.

In the illustrated embodiment, the first pair of contacts defines the control contact, the second pair of contacts defines the positive contact, and the medial contact defines the negative contact. For example, as shown in FIG. 7A, while the vehicle is in the first orientation with the first forward-facing direction, a first contact of the first pair (e.g., contact 1) aligns with and conductively couples to the control off-board contact. A first contact of the second pair (e.g., contact 2) aligns with and conductively couples to the positive off-board contact. The medial contact aligns with and conductively couples to the negative off-board contact.

FIG. 7B is a diagram of the power transfer system of FIG. 7A with the vehicle in the second orientation relative to the off-board power supply system. While the vehicle is oriented in the second forward-facing direction, the order of the contacts is flipped relative to the off-board contacts, which are unchanged. In this second coupling configuration, the second contact of the first pair (e.g., contact 5) aligns with and conductively couples to the control off-board contact. The second contact of the second pair (e.g., contact 4) aligns with and conductively couples to the positive off-board contact. The medial contact still aligns with and conductively couples to the negative off-board contact. Because the first and fifth contacts are electrically connected and the second and fourth contacts are electrically connected, the different orientations do not affect the conduction pathways. The power electronics may not need to switch the polarities of the electrical power in either of the orientations. Optionally, the power electronics of the vehicle power supply system may omit one or more components that would be used to switch polarities, such as a rectifier.

The illustrated embodiment shows one of six potential functional arrangements of the five-contact system. For example, any of the first pair, the second pair, and the medial contact can be used as the positive contact, the negative contact, or the control contact. In a second functional arrangement, the medial contact may function as the control contact, such that the medial contact aligns with and couples to the control off-board contact. The first pair may function as the positive contact, and the second pair may function as the negative contact.

FIG. 8 illustrates a power transfer system 800 according to another embodiment. The power transfer system includes a vehicle power supply system 802 that has a first contact set 804 and a second contact set 806 extending along a top side 806 of a vehicle 808. The first contact set is spaced apart from the second contact set along a length of the vehicle between a front end and a back end of the vehicle. The power transfer system include an off-board power supply system 810 which includes a positive off-board contact 812, a negative off-board contact 814, and a control off-board contact 816.

The first contact set includes a first positive contact 818A, a first control contact 820A, and a first negative contact 822A. The second contact set includes a second positive contact 818B, a second control contact 820B, and a second negative contact 822B. The first contact set of the vehicle power supply system has a reverse arrangement relative to the second contact set. For example, the first negative contact is the closest contact of the first contact set to a first side 824 of the vehicle, and the second negative contact is the closest contact of the second contact set to a second side 826 of the vehicle, opposite the first side. The control contact of each of the sets is in the middle.

When the vehicle has a first orientation relative to the off-board system the vehicle faces a first direction 828. In the first orientation, the vehicle operator positions the vehicle such that the first contact set aligns with the off-board contacts to conductively couple to the corresponding off-board contacts. For example, the first positive contact couples to the positive off-board contact, the first negative contact couples to the negative off-board contact, and the first control contact couples to the control off-board contact. The power transfer operation is similar to the embodiments described above, such as in FIGS. 4A and 4B. In the first orientation, the second contact set does not conduct electrical power from the off-board system. For example, the second contact set may be physically separated from the off-board contacts, as shown in FIG. 8. Alternatively, both contact sets may be conductively coupled to the off-board contacts in both orientations, but the second contact set is selectively electrically disconnected to block the conduction of electrical power through the second contact set. The controller of the vehicle power supply system may actuate one or more switch devices to control the conductive states of the first and second contact sets.

When the vehicle has a second orientation relative to the off-board system the vehicle faces a second direction 830 that is opposite the first direction. In the second orientation, the vehicle operator positions the vehicle such that the second vehicle contact set aligns with the off-board system to conductively couple to the corresponding off-board contacts. For example, the second positive vehicle contact couples to the positive off-board contact, the second negative vehicle contact couples to the negative off-board contact, and the second control vehicle contact couples to the control off-board contact. In the second orientation, the first vehicle contact set does not conduct electrical power from the off-board system. As described above, the first vehicle contact set may be physically separated from the off-board contacts or electrically disconnected to block conduction.

Optionally, the first vehicle contact set includes a first ground vehicle contact, and the second contact set includes a second ground vehicle contact. The contact sets may be arranged in a two-by-two grid or array. The off-board contacts may include a ground off-board contact. The off-board contacts may be arranged in a two-by-two grid. In the first orientation, the first ground vehicle contact is positioned to conductively couple to the ground off-board contact to provide a ground path. In the second orientation, the second ground vehicle contact is positioned to conductively couple to the ground off-board contact to provide the ground path.

FIG. 9 is a flow chart of a method 900 of forming a vehicle power supply system according to an embodiment. The method optionally may include more steps than shown, fewer steps than shown, and/or different steps than shown in FIG. 9. At step 902, plural vehicle contacts are coupled to a vehicle such that the contacts extend along a top side of the vehicle. The vehicle can be a rail vehicle, a bus, or another type of vehicle. The vehicle contacts may be elongated rails that are electrically conductive and exposed for contacting corresponding off-board contacts of an off-board power supply system. The contacts may be positioned such that the contacts extend parallel to one another. Optionally, the contacts may extend parallel to a longitudinal axis of the vehicle extending from a front end to a back end of the vehicle. In an embodiment, the contacts may include a control contact and at least first and second power contacts. The contacts are arranged to enable the vehicle power supply system to successfully and safely receive electrical power from the off-board system in each of two opposite orientations of the vehicle relative to the off-board system.

At step 904, the control contact is electrically connected to a controller of the vehicle power supply system. The controller may generate and/or receive a control signal that is used by the controller (or a controller on the off-board system) to determine whether the conditions are appropriate to initiate electrical power transfer from the off-board system to the vehicle power supply system to power the vehicle.

At step 906, the first and second power contacts are electrically connected to power electronics of the vehicle power supply system. The power electronics may be electrically connected between the power contacts and an energy storage device onboard the vehicle. When the electrical power transfer is initiated, the power electronics may receive positive and negative polarities of electrical power from the first and second contacts, respectively, and may convey the electrical power to the energy storage device to charge the energy storage device. Optionally, the power electronics may be controlled to convey at least some of the received electrical power to one or more motors of the vehicle to power propulsion of the vehicle, without storing the electrical power in the energy storage device. The power electronics may include a rectifier to convert or switch the polarities of the received electrical power, depending on the orientation of the vehicle relative to the off-board system.

In one or more embodiments described herein, the vehicle contacts may receive the polarities of the electrical power for powering the vehicle while the vehicle is one or more of moving or stationary. For example, embodiments described above are designed for the vehicle to stop at the off-board power supply system for a period of time to charge the onboard energy storage device. In other embodiments, the off-board power supply system may transfer power to the vehicle as the vehicle moves. For example, the shapes of the vehicle contacts and the off-board contacts may be essentially switched from the embodiment shown in FIGS. 4A and 4B such that the off-board contacts are elongated rails that extend along the direction of travel of the vehicle. The vehicle contacts may be relatively shorter elongated bars or contact shoes that conductively couple to the off-board contacts and remain coupled over at least a distance of travel of the vehicle along the route.

Optionally, in the embodiments that include a control vehicle contact disposed between power vehicle contacts, the control contact may function as an insulator layer to prohibit electrical shorting between the power contacts of different polarity. For example, the control contact may prohibit water-created short circuits when the contacts are exposed to rain and other precipitation. Optionally, one or more deformable elements may be provided on or proximate to the vehicle contacts. The deformable elements may be positioned to physically contact the pantograph of the off-board system prior to the off-board contacts contacting the contacts, to soften the impact forces exerted on the contacts. Optionally, the ends of one or more of the contacts may be tapered and/or curved such that the ends of the contacts are lower than the middle segments of the contacts. The contacts may be positioned such that only the middle segments make contact with the off-board contacts (e.g., pantograph), to reduce the risk of damage to the ends of the contacts.

The controller of the vehicle power supply system and the controller of the off-board power supply system are described herein primarily with respect to the control signals (e.g., control pilot) for assuring that the conditions are proper before initiating electrical power transfer. The controllers may communicate information and/or data with each other using the coupling between the control vehicle contact and the control off-board contact. For example, the controller on the vehicle may generate a signal that identifies that vehicle, which the controller on the off-board system can use for vehicle tracking, billing purposes, or the like. The controller on the vehicle may provide any power transfer settings or constraints to the controller, such as a maximum current that the vehicle power supply system can accept, how much electrical power is desired, and the like.

Optionally, the power transfer system described herein can be used to transfer electrical power from the vehicle power supply system to the off-board power supply system. Optionally, the power transfer system may include a physical lock out cutoff switch, a spark arrestor, and/or a short shunter. The power transfer system optionally may include a camera or other visual-based sensor that is used for determining when the contacts of the vehicle are properly coupled to the corresponding off-board contacts. The electrical power that is transferred may be direct current in various embodiments, although the power electronics of the vehicle power supply system may be able to accept electrical power that is received with variable current and/or voltage. The following embodiments describe the transfer of alternating current (AC) electrical power.

Figure 10:
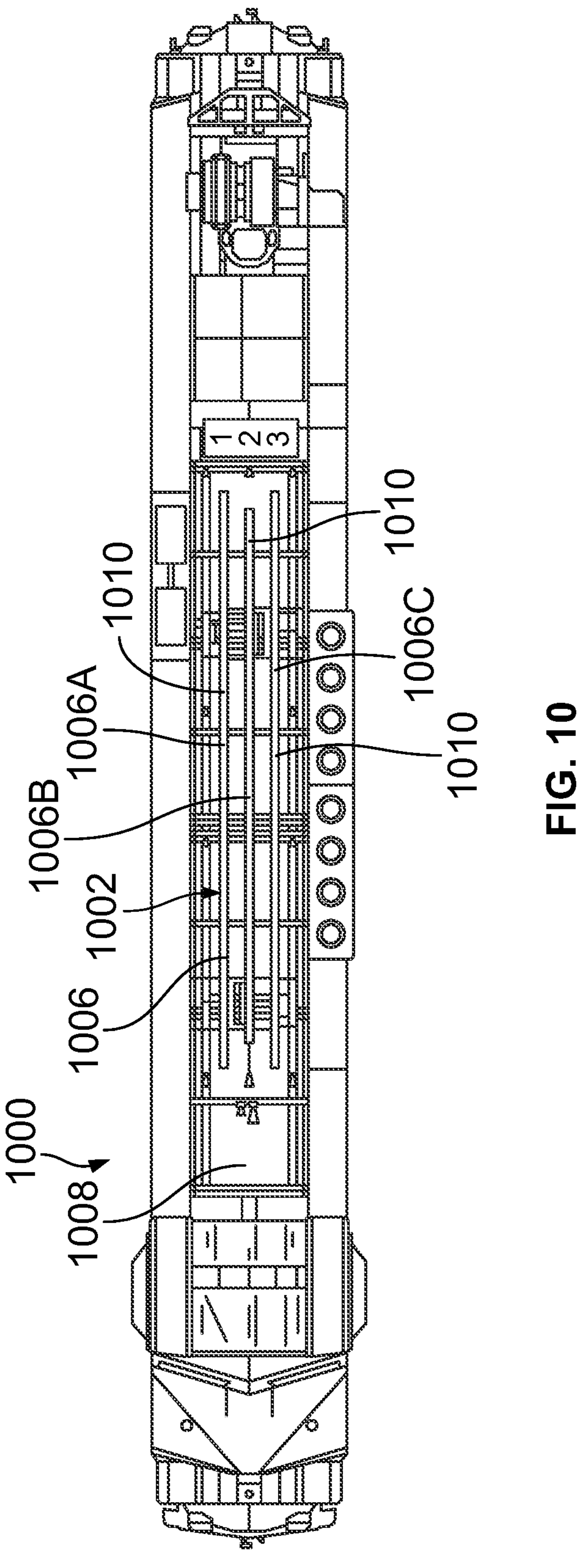
FIG. 10 is a top-down plan view of a vehicle that includes a vehicle power supply system according to an embodiment.

FIG. 10 is a top-down plan view of a vehicle 1000 that includes a vehicle power supply system 1002 according to an embodiment. The vehicle power supply system in FIG. 10 may be similar to the vehicle power supply system shown in FIG. 3, except designed to receive electrical power in the form of three-phase alternating current, as opposed to direct current. The vehicle power supply system includes plural vehicle contacts 1006 extending along a top side 1008 of the vehicle. The vehicle power supply system of FIG. 10 includes additional components that are not visible in the illustrated view, such as a controller and power electronics. The controller and power electronics may be the same or similar to the controller and power electronics described with reference to FIG. 2.

In the illustrated embodiment, the vehicle power supply system has three vehicle contacts labeled "1", "2", and "3". The vehicle contacts are laterally spaced apart from each other at different locations between the first and second sides of the vehicle. The vehicle contacts may be parallel to one another. The vehicle contacts may be parallel to a longitudinal or length axis of the vehicle. Each of the three contacts is designated as a power contact 1010 for receiving different phases of three-phase AC electrical power for powering the vehicle. The phases may be waveforms of electrical energy. The phases of the three-phase AC may be 120 degrees offset (e.g., out of phase) from one another. The phases may be separated onto different conductive lines for efficiency.

Figures 11, 12, 13A, 13B, 14A, 14B:
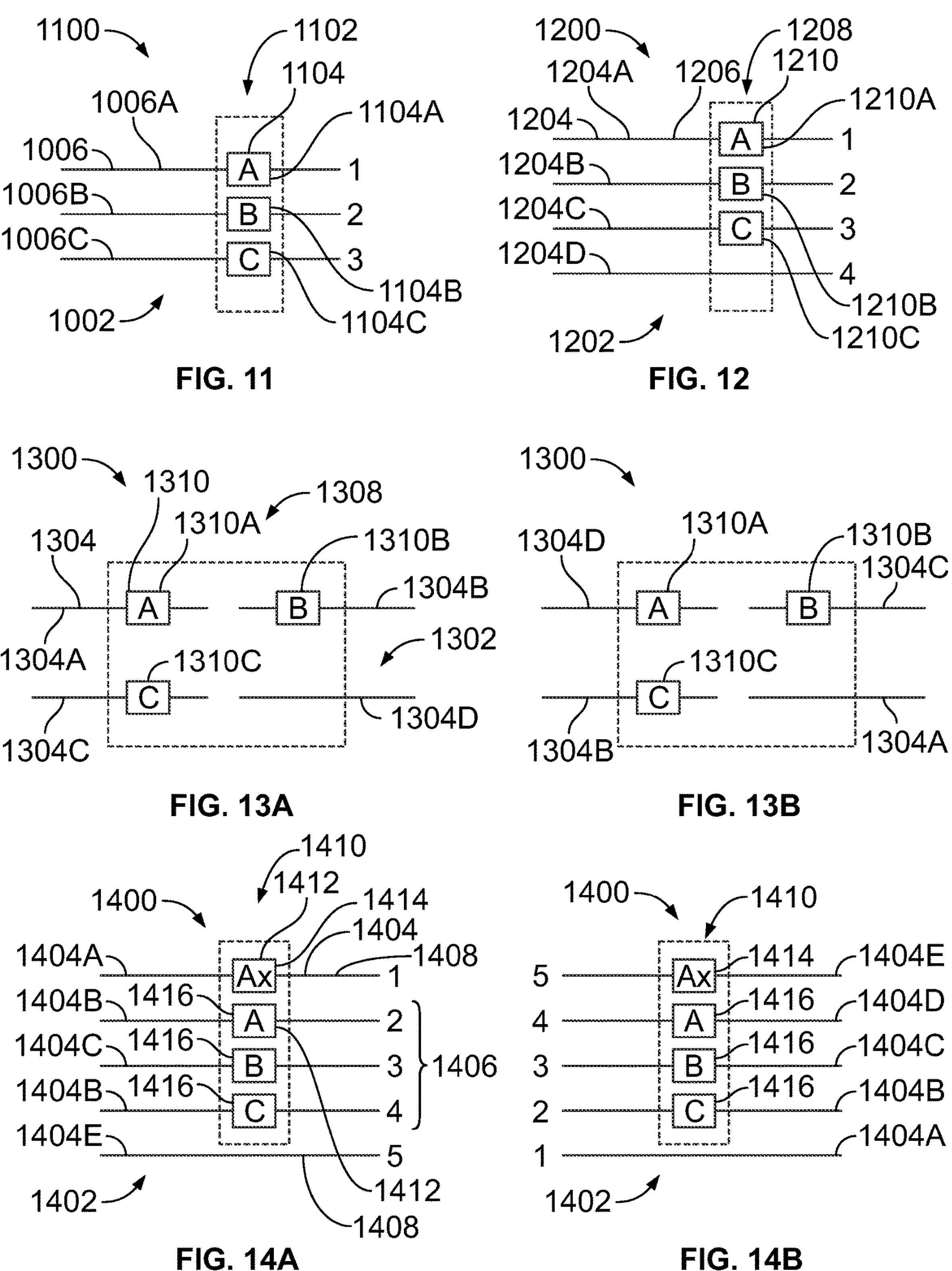
FIG. 11 is a diagram of a power transfer system that includes the vehicle power supply system shown in FIG. 10, according to an embodiment.
FIG. 12 is a diagram of a power transfer system 1200 according to another embodiment.
FIG. 13A is a diagram of a power transfer system according to another embodiment.
FIG. 13B is a diagram that shows a second coupling configuration of the power transfer system shown in FIG. 13A, based on a second orientation of the vehicle relative to the off-board power supply system.
FIG. 14A is a is a diagram of a power transfer system according to another embodiment.
FIG. 14B is a diagram that shows a second coupling configuration of the power transfer system shown in FIG. 14A, based on a second orientation of the vehicle relative to the off-board power supply system.

Additional reference is directed to FIG. 11, which is a diagram of a power transfer system 1100 that includes the vehicle power supply system 1002 shown in FIG. 10, according to an embodiment. The power transfer system includes an off-board power supply system 1102 with three off-board contacts 1104 positioned and shaped for conductively coupling to different corresponding vehicle contacts of the vehicle power supply system. The off-board contacts of the off-board power supply system are referred to as off-board contacts.

The diagram of FIG. 11 shows a first coupling configuration that occurs while the vehicle has a first orientation relative to the off-board system. The vehicle is oriented in the direction shown in FIG. 10, and the off-board contacts of the off-board system are disposed above the vehicle contacts in contact with the vehicle contacts. In the first orientation of the vehicle relative to the off-board power supply system, a first contact 1006A of the three vehicle contacts may receive a first phase (e.g., A phase) of the three-phase AC. For example, the first contact aligns with and conductively couples to a first off-board contact 1104A that supplies the A phase of AC. A second (middle) contact 1006B may receive a second phase (e.g., B phase) of the three-phase AC from a second off-board contact 1104B that aligns with and conductively couples to the second contact. A third contact 1006C may receive a third phase (e.g., C phase) of the three-phase AC from a third off-board contact 1104C that aligns with and conductively couples to the third contact. The three vehicle contacts supply the different corresponding phases to the power electronics for powering at least one vehicle load, such as powering an electric traction motor and/or charging the energy storage device.

When the vehicle has the opposite, second orientation relative to the off-board power supply system, such that the vehicle would face to the right in FIG. 10, the vehicle contacts couple to the off-board contacts in a second coupling configuration. In the second coupling configuration, some of the vehicle contacts conductively couple to different off-board contacts of the off-board power supply system. For example, the first contact 1006A may couple to the third off-board contact and receive the third ("C") phase of the three-phase AC instead of the first phase. The third contact 1006C couples to the first off-board contact and receives the first ("A") phase, rather than the third phase. The second contact 1006B couples to the second off-board contact and receives the second ("B") phase in both orientations because the second contact and the second off-board contact are located in the middle.

The power transfer in the second coupling configuration is essentially the same as in the first coupling configuration. For example, the power electronics onboard the vehicle that are connected to the contacts receive three-phase AC in the first coupling configuration and receive the same three-phase AC in the second coupling configuration. The vehicle power electronics will accommodate any phase rotation. The illustrated three-rail configuration of vehicle contacts for receiving three-phase AC has three power contacts. Unlike the three-contact DC embodiments shown in FIGS. 4A, 4B, 5A, and 5B, the embodiment of FIG. 11 does not require any rectification or polarity-switching of the AC electrical power contact in either orientation of the vehicle relative to the off-board system. The vehicle power supply system is essentially agnostic with respect to which power contact receives which specific phase of AC (since it can detect the phase sequence and control the system accordingly if needed in case of active rectifiers). The illustrated embodiment lacks both a control vehicle contact and a ground vehicle contact. The control connection and/or ground connection between the vehicle power supply system and the off-board system may be established through other coupling interactions, such as grounding through rails of a track. Optionally, the vehicle power supply system may not provide a control connection with the off-board system. Optionally, the off-board power supply system may include at least a second set of off-board contacts, similar to the set of off-board contacts shown in FIG. 11. In an embodiment, the vehicle contacts may be sufficiently long to conductively couple to both sets of off-board contacts during a common time period. The vehicle power supply system may be able to receive electrical power from both sets of off-board contacts at the same time, substantially increasing the power transfer rate.

FIG. 12 is a diagram of a power transfer system 1200 according to another embodiment. The power transfer system includes a vehicle power supply system 1202 with four vehicle contacts 1204. The vehicle power supply system may be similar to the vehicle power supply system shown in FIGS. 10 and 11, except for the additional contact. The four vehicle contacts are labeled "1", "2", "3", and "4". Each of the four contacts may be designated as a power contact 1206 for receiving different phases of three-phase AC electrical power for powering the vehicle. The power transfer system includes an off-board power supply system 1208 that has three off-board contacts 1210 that conduct different phases of the three-phase AC current. The off-board power supply system in FIG. 12 may be the same as in FIG. 11.

FIG. 12 shows a first coupling configuration which occurs while the vehicle has a first orientation relative to the off-board power supply system. In the first coupling configuration, a first contact 1204A of the vehicle contacts conductively couples to a first off-board contact 1210A for transfer of the first (or A) phase of the three-phase AC. A second contact 1204B conductively couples to a second off-board contact 1210B for transfer of the second (or B) phase of the three-phase AC. A third contact 1204C conductively couples to a third off-board contact 1210C for transfer of the third (or C) phase of the three-phase AC. A fourth contact 1204D of the vehicle contacts is not conductively coupled to any off-board contact. The fourth contact may be unused in the first coupling configuration, such that the fourth contact does not receive electrical power for powering the vehicle.

In a second coupling configuration, when the vehicle has the opposite orientation relative to the off-board power supply system, the coupling pairs of the vehicle contacts and the off-board contacts change. For example, in the second coupling configuration, the fourth contact conductively couples to the first off-board contact that conveys the A phase, the third contact conductively couples to the second off-board contact that conveys the B phase, and the second contact conductively couples to the third off-board contact that conveys the C phase. The first contact is uncoupled and unused in the second coupling configuration. As a result, the second vehicle contact alternates between receiving the B phase and the C phase, and the third vehicle contact alternates between receiving the C phase and the B phase (e.g., the phase that is not received by the second vehicle contact). The A phase is received by the first vehicle contact in the first coupling configuration, and is received by the fourth vehicle contact in the second coupling configuration. In an embodiment, the first and fourth vehicle contacts are electrically connected to each other, such that the two contacts effectively function as single power contact.

FIG. 13A is a diagram of a power transfer system 1300 according to another embodiment. The power transfer system in FIG. 13 is similar to the power transfer system shown in FIG. 12, except for an arrangement of the vehicle contacts 1304 and off-board contacts 1310. Rather than a set of four parallel rails, the vehicle power supply system 1302 in the illustrated embodiment has four vehicle contacts arranged in a two-by-two array. Each of the four contacts may be designated as a power contact for receiving different phases of three-phase AC electrical power for powering the vehicle. The power transfer system includes an off-board power supply system 1308 that has three off-board contacts 1310 that conduct different phases of the three-phase AC current. The off-board contacts may be arranged in a two-by-one array.

FIG. 13A shows a first coupling configuration according to a first orientation of the vehicle relative to the off-board power supply system. In the first coupling configuration, a first contact 1304A of the vehicle contacts conductively couples to a first off-board contact 1310A for transfer of the A phase of the three-phase AC. A second contact 1304B of the vehicle contacts conductively couples to a second off-board contact 1310B for transfer of the B phase of the three-phase AC, and a third contact 1304C of the vehicle contacts conductively couples to a third off-board contact 1310C for transfer of the C phase of the three-phase AC. A fourth contact 1304D of the vehicle contacts is not conductively coupled to any off-board contact, and is unused. The second and third contacts are diagonal to each other in the illustrated embodiment, and the first and fourth contacts are diagonal to each other.

FIG. 13B is a diagram that shows a second coupling configuration of the power transfer system shown in FIG. 13A, based on a second orientation of the vehicle relative to the off-board power supply system. In the second coupling configuration, the fourth contact conductively couples to the first off-board contact that conveys the A phase, the third contact conductively couples to the second off-board contact that conveys the B phase, and the second contact conductively couples to the third off-board contact that conveys the C phase. The first contact is uncoupled and unused in the second coupling configuration. The embodiment shown in FIGS. 13A and 13B is constructively equivalent to the embodiment shown in FIG. 12. For example, each of the second and third vehicle contacts, which are diagonal from each other, alternates between receiving a corresponding one of the B and C phases, depending on the orientation. The A phase is received by the first vehicle contact in the first coupling configuration, and is received by the fourth vehicle contact in the second coupling configuration. In an embodiment, the first and fourth vehicle contacts are electrically connected to each other, such that the two contacts effectively function as single power contact.

In an embodiment, one or more of the vehicle contacts of the vehicle power supply system are designated as auxiliary contacts, rather than power contacts. An auxiliary vehicle contact is an electrical contact that provides a ground connection, a control connection, or the like, with a corresponding off-board contact of the off-board power supply system. For example, the vehicle contacts may include at least three power contacts that receive the different phases of the three-phase AC, and at least one auxiliary contact. One type of auxiliary contact is a control contact that provides connection assurance to ensure, for safety purposes, that all of the contacts are properly connected prior to permitting power transfer between the vehicle power supply system and the off-board system. For example, the control contact may conduct a control signal to and/or from a control off-board contact, indicative of whether the power contacts are conductively coupled with corresponding off-board contacts. Another type of auxiliary contact is a ground contact that provides a conductive ground path between the vehicle power supply system and the off-board system. For example, the ground contact may couple to a ground off-board contact to establish the ground path.

FIG. 14A is a is a diagram of a power transfer system 1400 according to another embodiment. The power transfer system includes a vehicle power supply system 1402 with five vehicle contacts 1404. Three of the vehicle contacts are power contacts 1406 that receive the three-phase AC and convey the three-phase AC to the power electronics for powering the vehicle. Two of the vehicle contacts are auxiliary contacts 1408 that provide a control connection and/or a ground connection with the off-board power supply system 1410. The auxiliary contacts may not conduct electrical power for powering the vehicle. The auxiliary contacts optionally are not connected to the power electronics. In the illustrated embodiment, the vehicle contacts are spaced apart laterally in a single column and extend parallel to one another. The power contacts are disposed between the two auxiliary contacts. For example, the first contact 1404A at one end of the column is a first auxiliary contact, and the fifth contact 1404E at the other end of the column is a second auxiliary contact. The second, third, and fourth contacts 1404B, 1404C, 1404D of the vehicle contacts are power contacts. The off-board system has four supply off-board contacts 1412 in the illustrated embodiment. The off-board contacts include an auxiliary off-board contact 1414 and three power off-board contacts 1416.

FIG. 14A shows a first coupling configuration according to a first orientation of the vehicle relative to the off-board power supply system. In the first coupling configuration, the first auxiliary contact 1404A of the vehicle contacts conductively couples to the auxiliary off-board contact. The power contacts 1404B, 1404C, 1404D conductively couple to different corresponding power off-board contacts for transfer of the A, B, and C phases of the three-phase AC. The second auxiliary contact 1404E is not conductively coupled to any off-board contact. In the first coupling configuration, control and/or grounding is provided along the path that includes the first auxiliary contact and the auxiliary off-board contact.

FIG. 14B is a diagram that shows a second coupling configuration of the power transfer system shown in FIG. 14A, based on a second orientation of the vehicle relative to the off-board power supply system. In the second coupling configuration, the vehicle contacts are flipped or reversed relative to the off-board contacts. For example, the second auxiliary contact of the vehicle contacts is conductively coupled to the auxiliary off-board contact. The power vehicle contacts remain conductively coupled to power off-board contacts for transfer of the A, B, and C phases of the three-phase AC. Two of the power vehicle contacts (e.g., 1404B and 1404D) are coupled to different corresponding power off-board contacts in the second coupling configuration relative to the first coupling configuration, although there is no change in the operation. As described above, each of the three power contacts may be agnostic to the specific phase that the power contact receives. In FIG. 14B, The first auxiliary contact is not conductively coupled to any off-board contact. In the second coupling configuration, control and/or grounding is provided along the path that includes the second auxiliary contact and the auxiliary off-board contact. In an embodiment, the first and fifth contacts (e.g., 1404A and 1404E), which represent the two auxiliary contacts, may be electrically connected to each other to effectively function as single auxiliary contact that provides control and/or grounding connections regardless of the vehicle orientation.

In an alternative embodiment that includes the five vehicle contacts shown in FIGS. 14A and 14B, the middle contact 1404C may be the only auxiliary contact 1408, and the other four contacts 1404A, 1404B, 1404D, 1404E may be power contacts. The off-board contacts 1412 of the off-board power supply system may be rearranged such that the auxiliary off-board contact 1414 aligns with the middle contact in both coupling configurations. For example, the auxiliary off-board contact may be swapped with the power off-board contact that supplies the B phase shown in FIGS. 14A and 14B. This updated arrangement ensures that the auxiliary off-board contact couples to the auxiliary contact in both the first orientation of the vehicle and the second orientation of the vehicle relative to the off-board system. Three of the four power contacts will be used to receive the three-phase AC in each of the first and second orientations, although the specific power contacts that are used and the specific phases received by each used power contact may change based on the orientation. For example, the second contact 1404B may receive the A phase in the first orientation, and the second contact may receive the C phase in the second orientation, similar to the embodiment in FIGS. 14A and 14B.

In one or more embodiments, the vehicle power supply system and/or the off-board power supply system may reconfigure the functions, or roles, of the respective contacts based on a determined congruence with the conductive elements of the mating system. For example, the onboard controller of the vehicle power supply system may switch the role of a given vehicle contact from a power contact to an auxiliary contact (and vice-versa), in response to determining that the arrangement of the vehicle contacts, while in a coupled state with the off-board supply contacts, is not complementary to the arrangement of the supply contacts. Alternatively, the controller of the off-board power supply system may perform a similar operation, such that the controller may change the role of one or more off-board contacts in response to determining the lack of congruence, rather than changing the role of any of the vehicle contacts.

Figures 15, 16A, 16B:
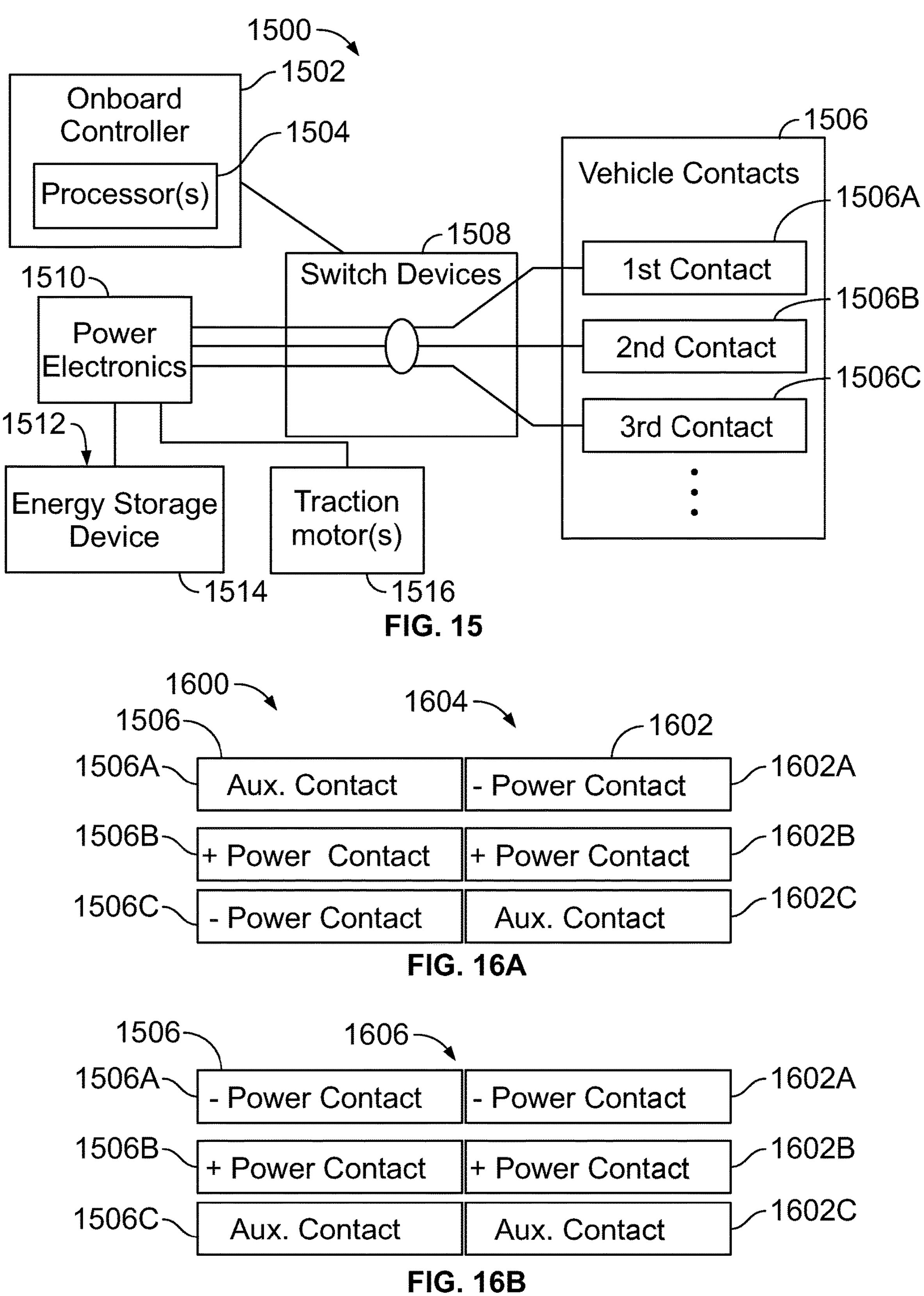
FIG. 15 is a block diagram of a vehicle power supply system that is designed to receive power from an off-board power supply system for powering a vehicle according to an embodiment.
FIG. 16A shows a first coupling configuration of vehicle contacts of the vehicle power supply system shown in FIG. 15 and corresponding electrical contacts of an off-board power supply system according to an embodiment.
FIG. 16B shows a second coupling configuration which occurs when the vehicle power supply system shown in FIG. 16A has a second orientation relative to the off-board power supply system.

FIG. 15 is a block diagram of a vehicle power supply system 1500 that is designed to receive power from an off-board power supply system for powering a vehicle according to an embodiment. The vehicle power supply system may be disposed onboard a vehicle. The vehicle power supply system may share several components with the vehicle power supply system shown in FIG. 2. The vehicle power supply system includes an onboard controller 1502 that has one or more processors 1504. The vehicle power supply system includes plural vehicle contacts 1506, including at least a first contact 1506A, a second contact 1506B, and a third contact 1506C. The vehicle contacts may be any of the vehicle contacts shown and described in FIGS. 3 through 8 and FIGS. 10 through 14B. The vehicle contacts includes at least three contacts, such as a total of three, four, five, or more contacts.

In an embodiment, the onboard controller may select, and optionally modify, the role or function of at least some of the vehicle contacts. For example, FIG. 16A shows a first coupling configuration 1600 of the vehicle contacts of the vehicle power supply system shown in FIG. 15 and corresponding off-board contacts 1602 of an off-board power supply system 1604. The first vehicle contact in FIG. 16A is designated as an auxiliary contact, such as a control contact or a ground contact. The second contact is designated as a positive power contact (for receiving a positive polarity of DC electrical power), and the third contact is designated as a negative power contact (for receiving a negative polarity of DC electrical power). The off-board contacts have complementary functions. For example, one off-board contact 1602A is a negative power off-board contact for supplying the negative polarity DC, a second off-board contact 1602B is a positive power off-board contact for supplying the positive polarity DC, and a third off-board contact 1602C is an auxiliary off-board contact for establishing a control connection and/or a ground connection with the vehicle power supply system.

When the vehicle has a first orientation relative to the off-board power supply system 1604, the vehicle contacts conductively couple to the off-board contacts of the off-board system in the first coupling configuration. In the first coupling configuration, the auxiliary vehicle contact couples to the negative power off-board contact, and the negative power vehicle contact couples to the auxiliary off-board contact. There is a mismatch between an arrangement of the vehicle contacts and an arrangement of the off-board contacts. Stated differently, the arrangement of the vehicle contacts is not complementary to the arrangement of the off-board contacts in the first coupling configuration. In the first coupling configuration, no electrical power would be transferred between the two systems due to the mismatch. For example, if the auxiliary lines are control lines, the control signals would not be successfully conducted across the interface between the auxiliary vehicle contact and the auxiliary off-board contact, so the transfer-critical control connection would not established. Furthermore, the auxiliary vehicle contact is not electrically set up, in the current configuration, to receive DC power from the negative power off-board contact. This mismatch may occur when a vehicle approaches the off-board power supply system in an opposite orientation than the orientation that would cause the vehicle contacts to complement the off-board contacts.

For example, FIG. 16B shows a second coupling configuration 1606 which occurs when the vehicle has a second orientation relative to the off-board power supply system. In the second coupling configuration, the arrangement of the vehicle contacts is flipped relative to the first coupling configuration because of the opposite vehicle orientation. The arrangement of the off-board contacts is the same as in the first coupling configuration. In the second coupling configuration, the negative power vehicle contact couples to the negative power off-board contact, the positive power vehicle contact couples to the positive power off-board contact, and the auxiliary vehicle contact couples to the auxiliary off-board contact. The arrangement of the vehicle contacts is complementary to the arrangement of the off-board contacts of the off-board power supply system. For example, a control connection and/or ground connection may be established between the auxiliary vehicle contact and the auxiliary off-board contact.

In an embodiment, the onboard controller is able to select between the arrangement of the vehicle contacts shown in FIG. 16A and the flipped arrangement of the vehicle contacts shown in FIG. 16B in order to establish congruence between the vehicle contacts and the off-board contacts. The vehicle contact arrangement of the first coupling configuration shown in FIG. 16A may be a first role configuration of the three vehicle contacts shown in FIG. 15. The contact arrangement of the second coupling configuration shown in FIG. 16B may be a second role configuration of the three vehicle contacts in FIG. 15. The controller is able to select and switch between the first and second role configurations to enable the vehicle contacts to match with corresponding off-board contacts, in each of at least two opposite vehicle orientations.

Referring back to FIG. 15, the vehicle power supply system may include switch devices 1508 disposed between the vehicle contacts and power electronics 1510. The power electronics are connected to at least one vehicle load 1512. The vehicle load may include an energy storage device 1514, one or more electric traction motors 1516, and/or the like. The power electronics and the energy storage device may be the same or similar to the power electronics and the energy storage device, respectively, shown in FIG. 2. The switch devices may control the conductive pathway extending from each of the vehicle contacts. For example, the conductive pathways extending from designated power contacts would connect to the vehicle load to power the load. The conductive pathway extending from a designated auxiliary contact would not connect to the vehicle load because the auxiliary contacts do not conduct electrical power for powering the load. For example, the switch devices may configure a pathway from a control contact to the onboard controller and/or a signal emitter/detector device controlled by the onboard controller.

The switch devices may include electromechanical contactors (e.g., relays) that are configured to withstand relatively high electric current and voltage along the circuits. The electromechanical contactors may have solenoids that convert electrical energy of the control signals received from the onboard controller to mechanical energy that moves contacts within the contactors into engagement, to establish conduction, and out of engagement, to block conduction. In addition or as an alternative to the electromechanical contactors, the switch devices may include solid state switches (e.g., solid state relays). Solid state relays may utilize electrical and optical properties of solid-state semiconductors and may have no moving parts. The solid-state switches may avoid the risk of arcing while switching between the open and closed states. Based on the relatively high energy densities (or loads) conducted through the circuits to and from the traction motors, the vehicle power supply system may also include a solid-state ground fault scheme. In still another embodiment, the switching devices may include optical switches, such as insulated-gate bipolar transistors (IGBT), MOSFETs, or other transistors that have optical interfaces (e.g., an LED-to-photoreceptor isolated input, or other optical isolator control input interface).

In an embodiment, after establishing conductive coupling with the off-board contacts, the onboard controller may determine which of the two coupling configurations shown in FIGS. 16A and 16B is present. More specifically, the controller may determine whether the current role configuration of the vehicle contacts complements the arrangement of the off-board contacts, or is not complementary (e.g., forms a mismatch). In the event that the mismatch is determined, the controller may actuate the switch device s to change the role configuration of the vehicle contacts. For example, actuating the switch devices may change the first vehicle contact from the auxiliary contact shown in FIG.

16A to the negative power contact shown in FIG. 16B, and may change the third vehicle contact from the negative power contact to the auxiliary contact. Upon switching to the second role configuration, the controller may achieve complementary coupling between the vehicle contacts and the off-board contacts, as is shown in the second coupling configuration of FIG. 16B. The controller may change the roles of one or more of the vehicle contacts via the switch devices, without physically moving or altering the vehicle contacts themselves.

Although FIGS. 16A and 16B show an embodiment in which DC power is transferred from the off-board power supply system to the vehicle power supply system, the vehicle power supply system shown in FIG. 15 is applicable to either DC or AC power transfer. For example, the vehicle power supply system shown in FIG. 15 may be applicable to any of the vehicle contact arrangements shown and described herein. In an AC embodiment, the vehicle contacts may include at least three power contacts and at least one auxiliary contact in each of the first and second role configurations.

Figure 17:
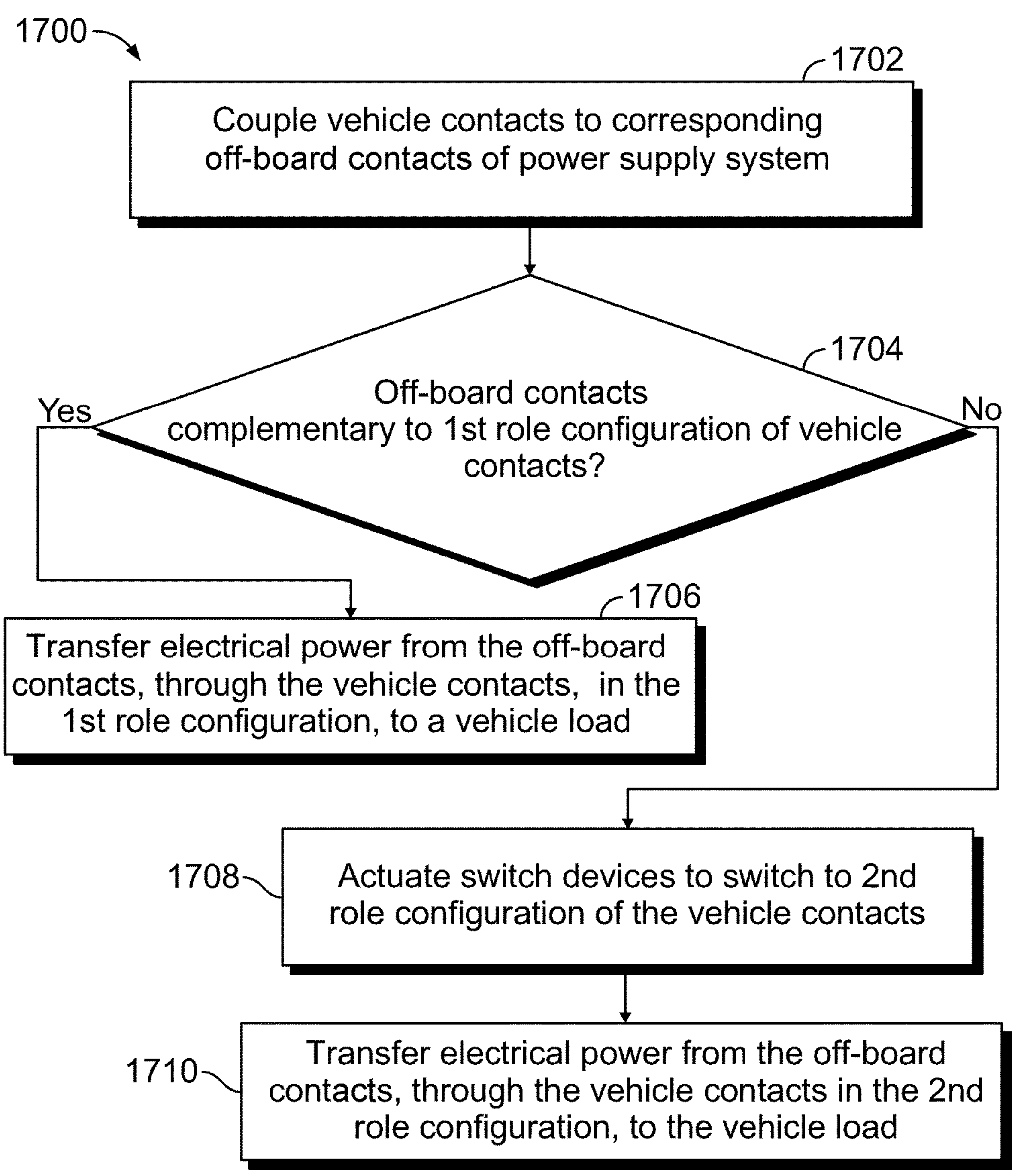
FIG. 17 is a flow chart of a method for controlling electrical power transfer from an off-board power supply system to a vehicle power supply system onboard a vehicle according to an embodiment.

FIG. 17 is a flow chart of a method 1700 for controlling electrical power transfer from an off-board power supply system to a vehicle power supply system onboard a vehicle according to an embodiment. The method may be performed in whole, or in part, by the onboard controller of the vehicle power supply system shown in FIG. 15. At step 1702, vehicle contacts of the vehicle power supply system, extending along a top side of a vehicle, are conductively coupled to off-board contacts of the off-board power supply system. For example, a vehicle may drive up to and stop under a pantograph that holds the off-board contacts of the off-board power supply system. The pantograph may lower the off-board contacts into physical contact with the vehicle contacts.

At step 1704, it is determined whether an arrangement of the off-board contacts of the off-board system is complementary to a first role configuration of the vehicle contacts. The first role configuration represents the existing configuration in which the vehicle contacts are connected to a vehicle load, such as an energy storage device and/or an electric traction motor, which the vehicle contacts are coupled to the off-board contacts of the off-board system. The first role configuration of the vehicle contacts may include at least two contacts designated as power contacts and at least one contact designated as an auxiliary contact. The role of the power contacts may be to receive different phases of AC and/or different polarities of DC from the off-board contacts, and conduct such AC and/or DC towards the vehicle load (e.g., for powering the vehicle). The role of the auxiliary contact(s) may be to provide a ground connection and/or a control connection with a corresponding one of the off-board contacts of the off-board system.

In an embodiment, the onboard controller may make the congruence determination. For example, the onboard controller may control emission of an electrical test signal into the auxiliary contact of the first role configuration while the auxiliary contact is conductively coupled to one of the off-board contacts of the off-board system. The onboard controller may then monitor the auxiliary contact after the electrical test signal is emitted into the auxiliary contact. The onboard controller may monitor the auxiliary contact for the presence of an expected electrical characteristic. For example, if an expected (e.g., first) electrical characteristic is detected along the auxiliary contact after submitting the test signal into the auxiliary contact, then the onboard controller may determine that the off-board contacts are indeed complementary to the first role configuration of the vehicle contacts. If, on the other hand, the onboard controller fails to detect the first electrical characteristic, that would indicate to the onboard controller that the off-board contacts are not complementary to the first role configuration of the vehicle contacts.

In an embodiment, the onboard controller may control a signal emitter device to inject the test signal into a ground vehicle contact that represents the auxiliary contact. The onboard controller may then monitor sensor data generated by a current sensor to detect the electrical characteristics along the ground contact in response to the test signal. In an example, the test signal may be a 10 V signal. If the off-board contacts are complementary to the first role configuration of the vehicle contacts, then a ground off-board contact is coupled to the ground vehicle contact. If the ground vehicle contact is indeed coupled to a ground off-board contact, then the monitored current along the ground vehicle contact is expected to rise quickly to a threshold current level, such as 5 A. The current along the ground vehicle contact rising to the threshold current would represent the expected electrical characteristics, that would be indicative of a complementary grounding connection. If the ground vehicle contact is not coupled to a ground off-board contact, but instead to a power off-board contact for example, then there would be no ground connection, so no current would flow. For example, the monitored current along the ground contact may be 0 A or close to 0 A, significantly less than the threshold level.

In another example, the onboard controller may generate a control signal that is conveyed along a control vehicle contact of the first role configuration. If the control vehicle contact is properly coupled to a corresponding control off-board contact, then the onboard controller may detect a reply control signal from the off-board system, may detect a return of the original control signal along a close loop, or the like. The receipt of a control signal along a closed loop indicates that the vehicle contacts complement the off-board contacts. The received control signal may represent the expected electrical characteristics. If the control contact is not coupled to a control off-board contact, there may be no closed loop formed, such that the onboard controller may not receive any control signal back.

If the onboard controller determines that the arrangement of the off-board contacts is, indeed, complementary to the first role configuration, then flow may proceed to step 1706. At step 1706, electrical power may be transferred to the vehicle load while the vehicle contacts are in the first role configuration. For example, the onboard controller may control the switch devices of the vehicle power supply system to supply the electrical power from the designated power contacts, according to the first role configuration, to the vehicle load. For example, the controller may not switch the role configuration before allowing or establishing the transfer of electrical power from the off-board system to the vehicle system.

On the other hand, if the onboard controller determines that the arrangement of the off-board contacts is not complementary to the first role configuration, then flow may proceed to step 1708. At step 1708, the onboard controller may actuate the switch devices of the vehicle power supply system to switch to a second role configuration of the vehicle contacts. For example, the switch devices may connect the vehicle contacts to the vehicle load in the second role configuration, such that at least one vehicle contact that was designated as an auxiliary contact in the first role configuration is designated as one of the power contacts in the second role configuration. Furthermore, at least one of the vehicle contacts that was designated as a power contact in the first role configuration may be designated as an auxiliary contact in the second role configuration. The switch devices may change the roles of several vehicle contacts without affecting the positioning of the vehicle contacts along the top side of the vehicle. Changing to the second role configuration may result in the vehicle contacts complementing the corresponding off-board contacts which are coupled to the vehicle contacts, as shown in FIG. 16B for example.

At step 1710, electrical power may be transferred to the vehicle load while the vehicle contacts are in the second role configuration. For example, the onboard controller may control the switch devices of the vehicle power supply system to supply the electrical power from the designated power contacts, according to the second role configuration, to the vehicle load. The electrical power may be used to charge the energy storage device, may be directly supplied to one or more electric traction motors for immediate use powering propulsion, or the like.

Figure 18:
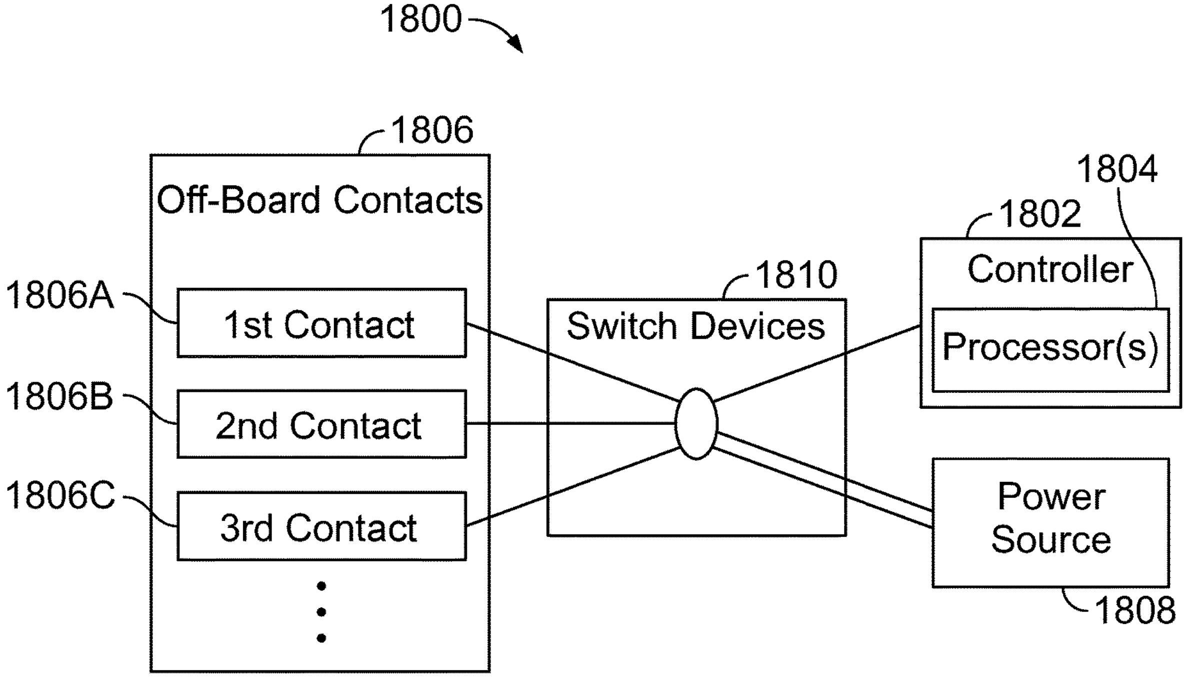
FIG. 18 is a block diagram of an off-board power supply system that supplies electrical power to a vehicle power supply system for powering a vehicle according to an embodiment.

FIG. 18 is a block diagram of an off-board power supply system 1800 that is designed to supply electrical power to a vehicle power supply system for powering a vehicle according to an embodiment. The off-board power supply system may share several components with the off-board power supply system shown in FIG. 2. The off-board power supply system includes a controller 1802 that has one or more processors 1804. The off-board power supply system includes plural off-board contacts 1806, including at least a first off-board contact 1806A, a second off-board contact 1806B, and a third off-board contact 1806C. The off-board contacts may be any of the off-board contacts shown and described herein. The off-board contacts includes at least three off-board contacts, such as a total of three, four, five, or more contacts.

In an embodiment, the controller of the off-board system may select, and optionally modify, the role or function of at least some of the off-board contacts. For example, the controller may perform functions similar to the onboard controller shown in FIG. 15 and described in the method of FIG. 17. For example, instead of modifying the roles of the vehicle contacts as described in the embodiment of FIGS. 15 and 17, the controller of the off-board system may be designed to modify the roles of the off-board contacts based on a determined non-congruence with the vehicle contacts.

The off-board power supply system may include a power source 1808 that supplies electrical power. The power source may be the power source shown in FIG. 2. The off-board power supply system may include switch devices 1810 disposed between the off-board contacts and the power source. The switch devices may control the conductive pathway extending from the power source and/or the controller to each of the off-board contacts. For example, the conductive pathways extending to designated power off-board contacts would connect to the power source to the power off-board contacts. The conductive pathway extending to a designated auxiliary off-board contact would not connect to the power source, because the auxiliary off-board contacts do not conduct electrical power for powering the load. For example, the switch devices may configure a pathway the controller to a control off-board contact and/or a signal emitter/detector device controlled by the controller.

The controller of the off-board system may perform a method for controlling electrical power transfer from the off-board power supply system to a vehicle power supply system onboard a vehicle according to an embodiment. The method may be similar to the method shown in FIG. 17. For example, step 1702 would be the same as in FIG. 17. At step 1704, the controller of the off-board power supply system would determine if the vehicle contacts of the vehicle power supply system are complementary to a first role configuration of the off-board contacts. The determination may involve injecting a test signal a monitoring for expected electrical characteristics, as described above in FIG. 17. If the controller determines that the vehicle contacts are indeed complementary to the first role configuration, then the controller may conduct electrical power from the power source to the off-board contacts that are designated as power off-board contacts in the first role configuration. The electrical power may be transferred to the power contacts of the vehicle power supply system to power the vehicle load. On the other hand, if the controller determines that the vehicle contacts are not complementary to the first role configuration, then the controller may actuate the switch devices to switch to a second role configuration of the off-board contacts, similar to step 1708. At least one power off-board contact may be switched to an auxiliary off-board contact, and at least one auxiliary off-board contact may be switched to a power off-board contact during the role configuration change. After changing to the second role configuration, the controller may conduct electrical power from the power source to the off-board contacts that are designated as power off-board contacts in the second role configuration. The electrical power may be transferred to the power contacts of the vehicle power supply system to power the vehicle load, similar to step 1710 in FIG. 17.

In one or more embodiments, a vehicle power supply system includes plural vehicle contacts extending along a top side of a vehicle. The plural vehicle contacts may include at least three power contacts may receive electrical power from an off-board power supply system to power the vehicle. Each of the power contacts may receive a different phase of three-phase alternating current of the electrical power. A first power contact of the power contacts may receive a first phase of the three-phase alternating current and a second power contact of the power contacts may receive a second phase of the three-phase alternating current while the vehicle has a first orientation relative to the off-board power supply system. The first power contact may receive the second phase of the three-phase alternating current and the second power contact may receive the first phase of the three-phase alternating current while the vehicle has a second orientation relative to the off-board power supply system. The second orientation may be opposite the first orientation.

Optionally, a third power contact of the power contacts may be disposed between the first power contact and the second power contact and may receive a third phase of the three-phase alternating current while the vehicle has the first orientation and while the vehicle has the second orientation. The plural vehicle contacts may include a first auxiliary contact and a second auxiliary contact disposed on opposite sides of the power contacts. The first auxiliary contact may provide one of a ground connection or a control connection with an off-board contact of the off-board power supply system while the vehicle is in the first orientation. The second auxiliary contact may provide the ground connection or the control connection with the off-board contact of the off-board power supply system while the vehicle is in the second orientation.

Optionally, the first and second power contacts may be disposed between a third power contact of the power contacts and a fourth power contact of the power contacts. The third power contact may receive a third phase of the three-phase alternating current while the vehicle has the first orientation, and the fourth power contact may receive the third phase of the three-phase alternating current while the vehicle has the second orientation. Optionally, the power contacts may include the first power contact, the second power contact, a third power contact, and a fourth power contact arranged in a two-by-two array with the first and second power contacts diagonal from each other. The third power contact may receive a third phase of the three-phase alternating current while the vehicle has the first orientation, and the fourth power contact may receive the third phase of the three-phase alternating current while the vehicle has the second orientation. Optionally, the third and fourth power contacts are electrically connected to each other.

Optionally, the vehicle power supply system has five vehicle contacts including the at least three power contacts and at least one auxiliary contact. The at least one auxiliary contact may provide one of a ground connection or a control connection with the off-board power supply system while the vehicle is in the first orientation and while the vehicle is in the second orientation. Optionally, the vehicle contacts are elongated and extend parallel to one another. The vehicle may be a rail vehicle that travels on a track, and the vehicle contacts may be oriented parallel to rails of the track on which the rail vehicle is disposed.

In one or more embodiments, an off-board power supply system includes at least three off-board contacts, switch devices, and a controller. The off-board contacts may conductively couple to vehicle contacts mounted on a vehicle for transferring electrical power to the vehicle. The switch devices may selectively connect the off-board contacts to a power source in a first role configuration and a second role configuration that is different from the first role configuration. Each of the first and second role configurations may include at least two of the off-board contacts designated as power contacts to conduct one of different phases or different polarities of electrical power from the power source to the vehicle contacts and another of the off-board contacts designated as an auxiliary contact to provide one of a ground connection or a control connection with a corresponding one of the vehicle contacts. The controller includes one or more processors and may be operably coupled to the switch devices. The controller may determine whether an arrangement of the vehicle contacts is complementary to the first role configuration of the off-board contacts, while the off-board contacts are connected to the power source in the first role configuration. Responsive to determining that the arrangement of the vehicle contacts is not complementary to the first role configuration of the off-board contacts, the controller may actuate the switch devices to connect the off-board contacts to the power source in the second role configuration before transferring electrical power to the vehicle via the power contacts of the second role configuration.

Optionally, the controller may determine whether the arrangement of the vehicle contacts is complementary to the first role configuration of the off-board contacts by controlling emission of an electrical test signal into the auxiliary off-board contact while the auxiliary off-board contact is conductively coupled to the corresponding vehicle contact. The controller may monitor the auxiliary off-board contact after the electrical test signal is emitted into the auxiliary off-board contact. The controller may determine that the arrangement of the vehicle contacts is not complementary to the first role configuration responsive to failing to detect a first electrical characteristic along the auxiliary off-board contact while monitoring the auxiliary off-board contact.

Optionally, after actuating the switch devices to connect the off-board contacts to the power source in the second role configuration, the controller may control the switch devices to supply the electrical power from the power source to the power off-board contacts of the second role configuration for transferring the electrical power to the vehicle contacts. Optionally, each of the first and second role configurations includes two power off-board contacts that conduct different polarities of electrical power, such that a first power off-board contact of the two power off-board contacts conducts a positive polarity of the different polarities of the electrical power, and a second power off-board contact of the two power off-board contacts conducts a negative polarity of the different polarities of the electrical power.

Optionally, the electrical power is three-phase alternating current, and each of the first and second role configurations includes three power off-board contacts that each conduct a different corresponding phase of the three-phase alternating current. Optionally, responsive to determining that the arrangement of the vehicle contacts is complementary to the first role configuration of the off-board contacts, the controller may actuate the switch devices to supply the electrical power from the power source to the power off-board contacts of the first role configuration for transferring the electrical power to the vehicle contacts.

In one or more embodiments, a method is provided that includes determining, via one or more processors, whether an arrangement of vehicle contacts mounted on a vehicle is complementary to a first role configuration of at least three off-board contacts of a power supply system disposed off-board the vehicle, while the off-board contacts are connected to a power source in the first role configuration. The first role configuration may include at least two of the off-board contacts designated as power off-board contacts to conduct one of different phases or different polarities of electrical power from the power source to the vehicle contacts and another of the off-board contacts designated as an auxiliary off-board contact to provide one of a ground connection or a control connection with a corresponding one of the vehicle contacts. Responsive to determining that the arrangement of the vehicle contacts is not complementary to the first role configuration of the off-board contacts, the method includes actuating switch devices to connect the off-board contacts to the power source in a second role configuration of the at least three off-board contacts. The off-board contact that was designated as the auxiliary off-board contact in the first role configuration may be designated as one of at least two power off-board contacts in the second role configuration and one of the off-board contacts designated as the power off-board contacts in the first role configuration may be designated as the auxiliary off-board contact in the second role configuration. The method includes transferring electrical power to the vehicle via the at least two power off-board contacts in the second role configuration.

Optionally, determining whether the arrangement of the vehicle contacts is complementary to the first role configuration of the off-board contacts may include controlling emission of an electrical test signal into the auxiliary off-board contact of the first role configuration while the auxiliary off-board contact is conductively coupled to one of the vehicle contacts. The method may include monitoring the auxiliary off-board contact after the electrical test signal is emitted into the auxiliary off-board contact, and determining that the arrangement of the vehicle contacts is not complementary to the first role configuration responsive to failing to detect a first electrical characteristic along the auxiliary off-board contact while monitoring the auxiliary off-board contact.

Optionally, transferring the electrical power to the vehicle via the at least two power off-board contacts in the second role configuration may include controlling the switch devices to supply the electrical power from the power source to the power off-board contacts of the second role configuration for transferring the electrical power to the vehicle contacts. Optionally, the method includes actuating the switch devices, responsive to determining that the arrangement of the vehicle contacts is complementary to the first role configuration of the off-board contacts, to supply the electrical power from the power source to the power off-board contacts of the first role configuration for transferring the electrical power to the vehicle contacts.

In one or more embodiments, a vehicle power supply system includes at least three vehicle contacts, switch devices, and an onboard controller. The vehicle contacts may extend along a top side of a vehicle and may be conductively coupled to off-board contacts of an off-board power supply system for transferring electrical power to the vehicle. The switch devices may be disposed onboard the vehicle to selectively connect the vehicle contacts to a vehicle load in a first role configuration and a second role configuration that is different from the first role configuration. Each of the first and second role configurations may include at least two of the vehicle contacts designated as power contacts to conduct one of different phases or different polarities of electrical power from the off-board contacts to the vehicle load, and another of the vehicle contacts designated as an auxiliary contact to provide one of a ground connection or a control connection with a corresponding one of the off-board contacts. The onboard controller includes one or more processors and may be operably coupled to the switch devices. The onboard controller may determine whether an arrangement of the off-board contacts is complementary to the first role configuration of the vehicle contacts, while the vehicle contacts are connected to the vehicle load in the first role configuration. Responsive to determining that the arrangement of the off-board contacts is not complementary to the first role configuration of the vehicle contacts, the controller may actuate the switch devices to connect the vehicle contacts to the vehicle load in the second role configuration before transferring electrical power to the vehicle load via the power contacts of the second role configuration.

Optionally, the onboard controller may determine whether the arrangement of the off-board contacts is complementary to the first role configuration of the vehicle contacts by controlling emission of an electrical test signal into the auxiliary contact while the auxiliary contact is conductively coupled to the corresponding off-board contact. The onboard controller may monitor the auxiliary contact after the electrical test signal is emitted into the auxiliary contact, and the onboard controller may determine that the arrangement of the off-board contacts is not complementary to the first role configuration responsive to failing to detect a first electrical characteristic along the auxiliary contact while monitoring the auxiliary contact.

Optionally, each of the first and second role configurations includes two power contacts that receive different polarities of electrical power, such that a first power contact of the two power contacts receives a positive polarity of the different polarities of the electrical power, and a second power contact of the two power contacts receives a negative polarity of the different polarities of the electrical power. Optionally, the electrical power is three-phase alternating current, and each of the first and second role configurations may include three power contacts that each receives a different corresponding phase of the three-phase alternating current.

Optionally, responsive to determining that the arrangement of the off-board contacts is complementary to the first role configuration of the vehicle contacts, the onboard controller may actuate the switch devices to conduct the electrical power received by the power contacts of the first role configuration to the vehicle load for powering the vehicle load. The vehicle load may include one or more of an electric motor for propelling movement of the vehicle or an energy storage device that is conductively coupled to the electric motor.

In one or more embodiments, a method includes determining, via one or more processors, whether an arrangement of off-board contacts of an off-board power supply system is complementary to a first role configuration of plural vehicle contacts extending along a top side of a vehicle. The vehicle contacts may be connected to a vehicle load in the first role configuration. The first role configuration may include at least two of the vehicle contacts designated as power contacts to conduct one of different phases or different polarities of electrical power from the off-board contacts to the vehicle load, and another of the vehicle contacts designated as an auxiliary contact to provide one of a ground connection or a control connection with a corresponding one of the off-board contacts. Responsive to determining that the arrangement of the off-board contacts is not complementary to the first role configuration of the vehicle contacts, the method may include actuating switch devices to connect the vehicle contacts to the vehicle load in a second role configuration of the vehicle contacts. The vehicle contact that was designated as the auxiliary contact in the first role configuration may be designated as one of the power contacts in the second role configuration and one of the vehicle contacts designated as the power contacts in the first role configuration may be designated as the auxiliary contact in the second role configuration. The method may include transferring electrical power to the vehicle load while the vehicle contacts are in the second role configuration.

Optionally, determining whether the arrangement of the off-board contacts is complementary to the first role configuration of the vehicle contacts may include controlling emission of an electrical test signal into the auxiliary contact of the first role configuration while the auxiliary contact is conductively coupled to one of the off-board contacts. Optionally, the method includes monitoring the auxiliary contact after the electrical test signal is emitted into the auxiliary contact, and determining that the arrangement of the off-board contacts is not complementary to the first role configuration responsive to failing to detect a first electrical characteristic along the auxiliary contact while monitoring the auxiliary contact. Optionally, transferring the electrical power to the vehicle load while the vehicle contacts are in the second role configuration may include controlling the switch devices to supply the electrical power from the power contacts of the second role configuration to the vehicle load. Optionally, responsive to determining that the arrangement of the off-board contacts is complementary to the first role configuration of the vehicle contacts, the method includes actuating the switch devices to supply the electrical power from the power contacts of the first role configuration to the vehicle load without switching to the second role configuration In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle power supply system comprising:

plural vehicle contacts extending along a top side of a vehicle, the plural vehicle contacts including at least three power contacts configured to receive electrical power from an off-board power supply system to power the vehicle, each of the power contacts configured to receive a different phase of three-phase alternating current of the electrical power, a first power contact of the power contacts configured to receive a first phase of the three-phase alternating current and a second power contact of the power contacts configured to receive a second phase of the three-phase alternating current while the vehicle has a first orientation relative to the off-board power supply system, and the first power contact configured to receive the second phase of the three-phase alternating current and the second power contact configured to receive the first phase of the three-phase alternating current while the vehicle has a second orientation relative to the off-board power supply system, the second orientation opposite the first orientation.

2. The vehicle power supply system of claim 1, wherein a third power contact of the power contacts is disposed between the first power contact and the second power contact and is configured to receive a third phase of the three-phase alternating current while the vehicle has the first orientation and while the vehicle has the second orientation.

3. The vehicle power supply system of claim 2, wherein the plural vehicle contacts include a first auxiliary contact and a second auxiliary contact disposed on opposite sides of the power contacts, the first auxiliary contact configured to provide one of a ground connection or a control connection with an off-board contact of the off-board power supply system while the vehicle is in the first orientation, and the second auxiliary contact configured to provide the ground connection or the control connection with the off-board contact of the off-board power supply system while the vehicle is in the second orientation.

4. The vehicle power supply system of claim 1, wherein the first and second power contacts are disposed between a third power contact of the power contacts and a fourth power contact of the power contacts, the third power contact configured to receive a third phase of the three-phase alternating current while the vehicle has the first orientation, and the fourth power contact configured to receive the third phase of the three-phase alternating current while the vehicle has the second orientation.

5. The vehicle power supply system of claim 1, wherein the power contacts include the first power contact, the second power contact, a third power contact, and a fourth power contact arranged in a two-by-two array with the first and second power contacts diagonal from each other, the third power contact configured to receive a third phase of the three-phase alternating current while the vehicle has the first orientation, and the fourth power contact configured to receive the third phase of the three-phase alternating current while the vehicle has the second orientation.

6. The vehicle power supply system of claim 5, wherein the third and fourth power contacts are electrically connected to each other.

7. The vehicle power supply system of claim 1, wherein the vehicle power supply system has five vehicle contacts including the at least three power contacts and at least one auxiliary contact, the at least one auxiliary contact configured to provide one of a ground connection or a control connection with the off-board power supply system while the vehicle is in the first orientation and while the vehicle is in the second orientation.

8. The vehicle power supply system of claim 1, wherein the vehicle contacts are elongated and extend parallel to one another.

9. The vehicle power supply system of claim 8, wherein the vehicle is a rail vehicle that travels on a track, and the vehicle contacts are oriented parallel to rails of the track on which the rail vehicle is disposed.

* * * * *